US010202986B2

(12) United States Patent
Tanaka et al.

(10) Patent No.: US 10,202,986 B2
(45) Date of Patent: Feb. 12, 2019

(54) HYDRAULIC DRIVE SYSTEM

(71) Applicant: KCM Corporation, Kako-gun, Hyogo (JP)

(72) Inventors: Shinichiro Tanaka, Kakogawa (JP); Hiroyasu Kodera, Kobe (JP)

(73) Assignee: KCM Corporation, Hyogo (JP)

( * ) Notice: Subject to any disclaimer, the term of this patent is extended or adjusted under 35 U.S.C. 154(b) by 147 days.

(21) Appl. No.: 15/107,954

(22) PCT Filed: Dec. 15, 2014

(86) PCT No.: PCT/JP2014/006236
§ 371 (c)(1),
(2) Date: Jun. 24, 2016

(87) PCT Pub. No.: WO2015/098033
PCT Pub. Date: Jul. 2, 2015

(65) Prior Publication Data
US 2016/0319848 A1 Nov. 3, 2016

(30) Foreign Application Priority Data

Dec. 27, 2013 (JP) .................................. 2013-272699

(51) Int. Cl.
*B62D 5/065* (2006.01)
*F15B 11/048* (2006.01)
(Continued)

(52) U.S. Cl.
CPC ............ *F15B 11/048* (2013.01); *B62D 5/062* (2013.01); *B62D 5/07* (2013.01); *B62D 5/08* (2013.01);
(Continued)

(58) Field of Classification Search
CPC ................................ B62D 5/065; B62D 5/075
See application file for complete search history.

(56) References Cited

U.S. PATENT DOCUMENTS 6,047,545 A 4/2000 Deininger
8,160,778 B2 * 4/2012 Nakamura ............. B62D 5/065
180/422

(Continued)

FOREIGN PATENT DOCUMENTS

DE 10 2010 023 735 A1 1/2011
JP 63-41278 A 2/1988
(Continued)

OTHER PUBLICATIONS

Japanese Office Action issued in counterpart Japanese Application No. 2013-272699 dated Nov. 15, 2016 (three pages).
(Continued)

Primary Examiner — F. Daniel Lopez
(74) Attorney, Agent, or Firm — Crowell & Moring LLP

(57) ABSTRACT

A hydraulic drive system (1) including a meter-in compensator (37) and a bleed-off compensator (42) comprises a plurality of sensors (64 to 68), a controller (62), and an outlet pressure switching valve (61). The controller (62) determines whether or not the state of a wheel loader (2) which is detected based on the signals output from the sensors (64 to 68) meets a predetermined steering limiting condition. When the controller (62) determines that the state of the wheel loader (2) meets the steering limiting condition, it outputs a command signal to the outlet pressure switching valve (61). The outlet pressure switching valve (61) reduces the flow rate of the hydraulic oil flowing to steering cylinders (18L, 18R), in response to the command signal in such a manner that the flow rate becomes lower than that corresponding to the operation amount of a handle of a steering device (35).

7 Claims, 11 Drawing Sheets

(51) Int. Cl.
*B62D 5/07* (2006.01)
*E02F 9/08* (2006.01)
*E02F 9/22* (2006.01)
*F15B 11/16* (2006.01)
*B62D 5/06* (2006.01)
*B62D 5/08* (2006.01)
*B62D 5/10* (2006.01)
*F04B 49/06* (2006.01)
*F04B 49/22* (2006.01)
*F15B 5/00* (2006.01)
*F15B 15/04* (2006.01)
*F15B 15/24* (2006.01)

(52) U.S. Cl.
CPC ............. *B62D 5/10* (2013.01); *E02F 9/0841* (2013.01); *E02F 9/225* (2013.01); *E02F 9/2228* (2013.01); *E02F 9/2296* (2013.01); *F04B 49/065* (2013.01); *F04B 49/225* (2013.01); *F15B 5/00* (2013.01); *F15B 11/162* (2013.01); *F15B 15/04* (2013.01); *F15B 15/24* (2013.01); *B62D 5/065* (2013.01); *F15B 2211/30535* (2013.01); *F15B 2211/45* (2013.01); *F15B 2211/50563* (2013.01); *F15B 2211/50572* (2013.01); *F15B 2211/5151* (2013.01); *F15B 2211/5756* (2013.01); *F15B 2211/781* (2013.01)

(56) References Cited

U.S. PATENT DOCUMENTS

| | | |
|---|---|---|
| 2006/0089773 A1 | 4/2006 | Hendron |
| 2007/0219689 A1 | 9/2007 | Gacioch et al. |
| 2010/0322807 A1 | 12/2010 | Kimura |
| 2012/0261010 A1 | 10/2012 | Kim |
| 2014/0318116 A1 | 10/2014 | Ito et al. |
| 2014/0366521 A1 | 12/2014 | Tanaka et al. |

FOREIGN PATENT DOCUMENTS

| | | |
|---|---|---|
| JP | 4-325305 A | 11/1992 |
| JP | 2006-321270 A | 11/2006 |
| JP | 2007-261509 A | 10/2007 |
| JP | 2012-159173 A | 8/2012 |
| JP | 2013-119358 A | 6/2013 |
| WO | WO 2009/149712 A1 | 12/2009 |
| WO | WO 2011/150010 A2 | 12/2011 |
| WO | WO 2013/084456 A1 | 6/2013 |
| WO | WO 2013/084457 A1 | 6/2013 |

OTHER PUBLICATIONS

International Preliminary Report on Patentability (PCT/IB/373) issued in PCT Application No. PCT/JP2014/006236 dated Jun. 28, 2016, including English translation of document C2 (Japanese-language Written Opinion (PCT/ISA/237)) previously filed on Jun. 24, 2016 (six pages).

Extended European Search Report issued in counterpart European Application No. 14874381.8 dated Dec. 7, 2017 (9 pages).

International Search Report (PCT/ISA/210) issued in PCT Application No. PCT/JP2014/006236 dated Mar. 17, 2015 with English translation (five pages).

Japanese-language Written Opinion (PCT/ISA/237) issued in PCT Application No. PCT/JP2014/006236 dated Mar. 17, 2015 (four pages).

* cited by examiner

HYDRAULIC DRIVE SYSTEM

TECHNICAL FIELD

The present invention relates to a hydraulic drive system in which a steering actuator and a work machine actuator are connected in parallel to a hydraulic pump, and the steering actuator is driven preferentially over the work machine actuator.

BACKGROUND ART

A work vehicle such as a wheel loader includes a work machine such as a bucket. The work vehicle is configured to extend and contract a work machine actuator such as a bucket cylinder and an arm cylinder to thereby move the work machine. The work vehicle is configured to be able to travel. The work vehicle is configured to drive a steering cylinder (steering actuator) to switch (change) a traveling direction. These actuators are hydraulically driven with hydraulic oil. The work vehicle includes a hydraulic drive device to drive these actuators. An exemplary hydraulic drive device is disclosed in Patent Literature 1.

In the hydraulic control device disclosed in Patent Literature 1, a steering actuator and a work machine actuator are connected in parallel to a hydraulic pump. A steering control valve and a work machine control valve are provided for the steering actuator and the work machine actuator, respectively, to control the flow rate of the hydraulic oil flowing to the steering actuator and the flow rate of the hydraulic oil flowing to the work machine actuator, respectively. A meter-in compensator is provided in a meter-in passage connecting the hydraulic pump to the steering control valve. A bleed-off compensator is provided in a bleed-off passage connecting the hydraulic pump to the work machine control valve. The meter-in compensator compensates a differential pressure between an upstream side and a downstream side of the steering control valve to secure the flow rate of the hydraulic oil supplied to the steering control valve. The bleed-off compensator makes use of a pressure on the downstream side of the steering control valve as a pilot pressure. Thus, the hydraulic oil is supplied to the work machine control valve while securing the flow rate of the hydraulic oil which is required for the steering device.

CITATION LIST

Patent Literature

Patent Literature 1: Japanese Laid-Open Patent Application Publication No. 2013-119358

SUMMARY OF INVENTION

Technical Problem

The work vehicle is required to obtain a steering performance with a high responsivity. With the above-described configuration, the hydraulic oil is flowed by the hydraulic pump preferentially to the steering actuator, to improve the responsivity. However, when the responsivity to the operation of the steering handle is high, the steering control valve moves quickly. Therefore, in the case of high-speed traveling, it is difficult to perform fine adjustment for straight traveling. For this reason, it is likely that the work vehicle cannot travel straight (in a straight line) well. As should be understood, if the responsivity to the operation of the steering handle during an actual work is applied to the responsivity to the operation of the steering handle during the high-speed traveling, without compensating (modifying) it, it is likely that the work vehicle cannot travel straight well. On the other hand, in a state in which the temperature of the hydraulic oil is low, the viscosity of the hydraulic oil increases, and the responsivity to the operation of the steering handle is lowered. In this situation, it is undesirable that the responsivity to the operation of the steering handle is lowered even during the high-speed traveling.

In view of the above, an object of the present invention is to provide a hydraulic drive system which can change the responsivity of a steering actuator to the operation amount of a steering device, depending on a vehicle state.

Solution to Problem

According to the present invention, a hydraulic drive system comprises a hydraulic pump to which a steering actuator for switching a traveling direction of a vehicle and a work machine actuator for moving a work machine are connected in parallel; a steering device for operating the steering actuator; a steering control valve which includes a spool which is movable according to an operation of the steering device and is configured to move the spool to adjust an opening degree of the spool to flow hydraulic oil from the hydraulic pump to the steering actuator at a flow rate corresponding to an amount of the operation of the steering device; an actuator control valve configured to control the flow rate of the hydraulic oil flowing from the hydraulic pump to the work machine actuator; a meter-in compensator which is provided in a meter-in passage connecting the hydraulic pump to the steering control valve, and is configured to adjust an opening degree of the meter-in passage in such a manner that the opening degree of the meter-in passage is increased as the opening degree of the spool of the steering control valve is increased by the operation of the steering device; a bleed-off compensator which is provided in a bleed-off passage connecting the hydraulic pump to the actuator control valve and is configured to adjust an opening degree of the bleed-off passage in such a manner that the opening degree of the bleed-off passage is reduced with an increase in a pressure of the hydraulic oil flowing to the steering actuator; a vehicle state detecting unit configured to detect a state of the vehicle; a controller configured to determine whether or not the state of the vehicle which is detected based on a signal output from the vehicle state detecting unit meets a predetermined steering limiting condition, and output a flow rate limiting command when the controller determines that the state of the vehicle meets the predetermined steering limiting condition; and a flow rate control mechanism configured to reduce the flow rate of the hydraulic oil flowing to the steering actuator in such a manner that the flow rate of the hydraulic oil flowing to the steering actuator becomes lower than the flow rate of the hydraulic oil corresponding to the amount of the operation of the steering device, in response to the flow rate limiting command received as an input from the controller.

In accordance with the present invention, when the controller determines that the state of the vehicle meets the steering limiting condition, the controller can reduce the flow rate of the hydraulic oil flowing to the steering actuator in such a manner that the flow rate of the hydraulic oil flowing to the steering actuator becomes lower than the flow rate of the hydraulic oil corresponding to the operation amount of the steering device. This makes it possible to lower the responsivity of the steering actuator to the operation amount of the steering device based on the state of the vehicle.

In the above-described invention, the flow rate control mechanism may be configured to reduce the flow rate of the hydraulic oil flowing through the steering control valve to reduce the flow rate of the hydraulic oil flowing to the steering actuator.

In accordance with this configuration, the flow rate of the hydraulic oil flowing to the steering actuator can be reduced without substantially affecting a steering feeling of the steering device.

In the above-described invention, the meter-in compensator may be configured to adjust the opening degree of the meter-in passage based on a differential pressure between an inlet pressure and an outlet pressure of the steering control valve which are input to the meter-in compensator in such a manner that the opening degree of the meter-in passage is increased as the outlet pressure is increased by the operation of the steering device, and the flow rate control mechanism may include a pressure adjustment valve which reduces the outlet pressure input to the meter-in compensator, in response to the flow rate limiting command input to the flow rate control mechanism.

In accordance with this configuration, the pressure adjustment valve can reduce the flow rate of the hydraulic oil flowing to the steering actuator in such a manner that the flow rate of the hydraulic oil flowing to the steering actuator becomes lower than the flow rate of the hydraulic oil corresponding to the operation amount of the steering device.

In the above-described invention, the bleed-off compensator may be configured to adjust the opening degree of the bleed-off passage based on a differential pressure between an outlet pressure of the steering control valve and an inlet pressure of the bleed-off compensator which are input to the bleed-off compensator in such a manner that the opening degree of the bleed-off passage is increased as the outlet pressure which is a pressure of the hydraulic oil flowing to the steering actuator is reduced, and the flow rate control mechanism may include a pressure adjustment valve which reduces the outlet pressure input to the bleed-off compensator, in response to the flow rate limiting command input to the flow rate control mechanism.

In accordance with this configuration, the pressure adjustment valve can reduce the flow rate of the hydraulic oil flowing to the steering actuator in such a manner that the flow rate of the hydraulic oil flowing to the steering actuator becomes lower than the flow rate of the hydraulic oil corresponding to the operation amount of the steering device.

In the above-described invention, the steering device may be configured to output pilot oil to the steering control valve at a flow rate corresponding to the amount of the operation of the steering device, the steering control valve may be configured to move the spool to a position corresponding to the flow rate of the pilot oil from the steering device to adjust the opening degree of the spool, and the flow rate control mechanism may include a flow rate control valve which adjusts the flow rate of the pilot oil in response to the flow rate limiting command input to the flow rate control mechanism.

In accordance with this configuration, the flow rate control valve can reduce the flow rate of the hydraulic oil flowing to the steering actuator in such a manner that the flow rate of the hydraulic oil flowing to the steering actuator becomes lower than the flow rate of the hydraulic oil corresponding to the operation amount of the steering device.

In the above-described invention, the controller may be configured to determine whether or not the state of the vehicle meets a predetermined flow rate switching condition based on the state of the vehicle which is detected by the vehicle state detecting unit, and output a flow rate switching command corresponding to the predetermined flow rate switching condition, and the flow rate control mechanism may be configured to change a reduction amount of the flow rate of the hydraulic oil flowing to the steering actuator, in response to the flow rate switching command input to the flow rate control mechanism.

In accordance with this configuration, the flow rate of the hydraulic oil flowing to the steering actuator, with respect to the operation amount of the steering device, can be changed based on the state of the vehicle. This makes it possible to change the responsivity of the steering actuator to the operation amount of the steering device based on the state of the vehicle.

In the above-described invention, the vehicle state detecting unit may be configured to detect a speed of the vehicle, and the flow rate switching condition may include a condition relating to the speed of the vehicle.

In accordance with this configuration, the responsivity of the steering actuator to the operation amount of the steering device can be changed based on the speed of the vehicle. For example, the flow rate of the hydraulic oil flowing to the steering actuator can be reduced in such a manner that the flow rate of the hydraulic oil flowing to the steering actuator becomes lower than the flow rate of the hydraulic oil corresponding to the operation amount of the steering device, as the vehicle speed is increased. This makes it possible to lower the responsivity of the steering actuator to the operation amount of the steering device. As a result, the vehicle can travel straight during high-speed traveling.

In the above-described invention, the vehicle state detecting unit may be configured to detect a temperature of the hydraulic oil, and the flow rate switching condition may include a condition relating to the temperature of the hydraulic oil.

With an increase in the temperature of the hydraulic oil, the viscosity of the hydraulic oil becomes lower and the responsivity of the steering actuator to the operation amount of the steering device is varied. However, in accordance with the above-described configuration, the flow rate of the hydraulic oil flowing to the steering actuator is reduced based on the temperature of the hydraulic oil in such a manner that the flow rate of the hydraulic oil flowing to the steering actuator becomes lower than that corresponding to the operation amount of the steering device, and thus a variation in the responsivity of the steering actuator due to the temperature of the hydraulic oil, can be suppressed.

In the above-described invention, the vehicle state detecting unit may be configured to detect an operation speed of the steering device, and the flow rate switching condition may include a condition relating to the operation speed of the steering device.

In accordance with this configuration, the responsivity of the steering actuator to the operation amount of the steering device can be changed based on the operation speed of the steering device. For example, in a case where a driver wishes to quickly switch (change) the traveling direction of the vehicle, the responsivity of the steering actuator can be made high. In this way, the traveling direction can be switched (changed) quickly.

Advantageous Effects of Invention

In accordance with the present invention, the responsivity of the steering actuator to the operation amount of the steering device can be changed based on the state of the vehicle.

The above and further objects, features and advantages of the present invention will more fully be apparent from the following detailed description of preferred embodiments with reference to the accompanying drawings.

DESCRIPTION OF EMBODIMENTS

Figure 1:
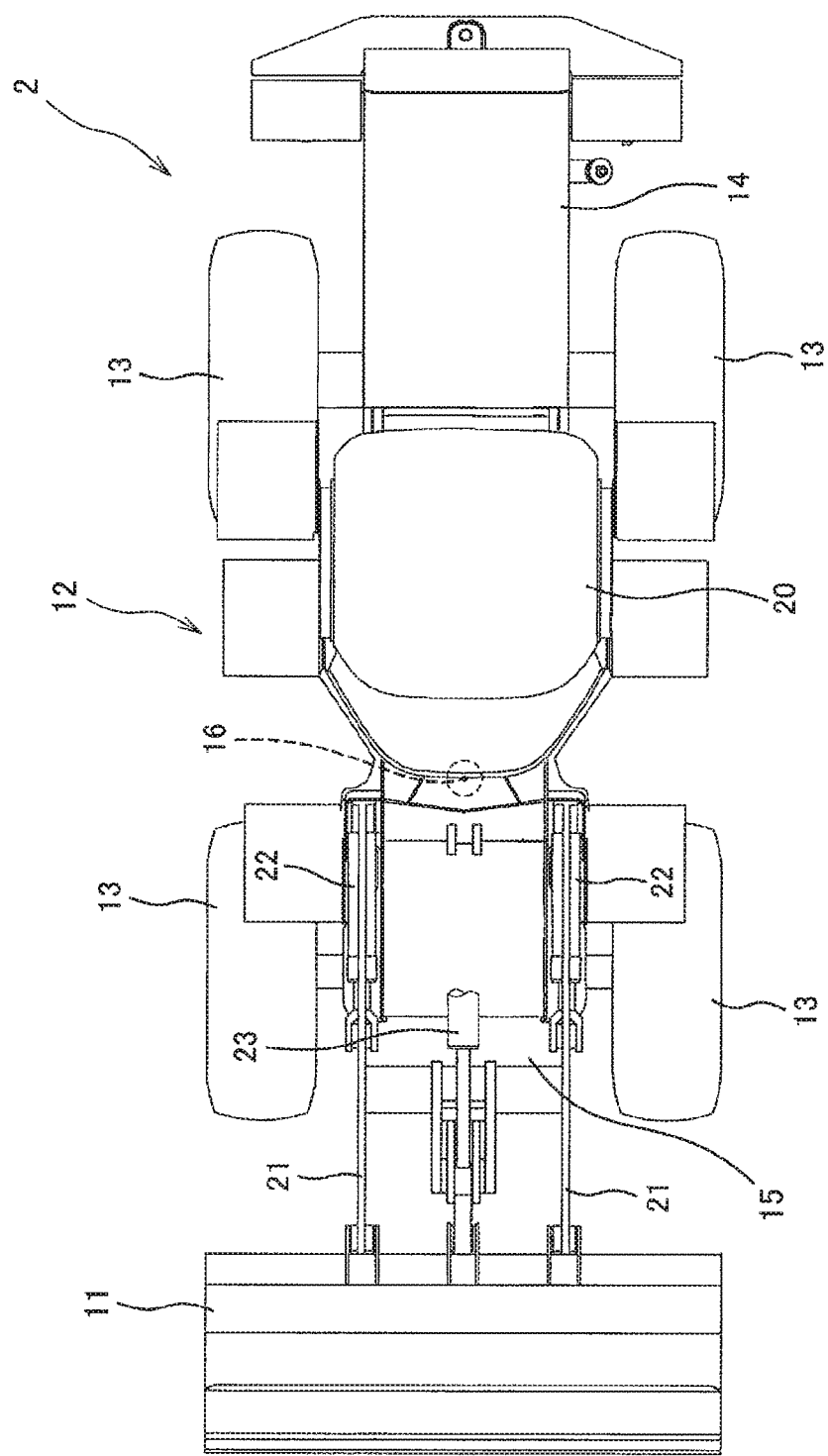
FIG. 1 is a plan view showing a wheel loader including a hydraulic drive system according to Embodiment 1 to Embodiment 3 of the present invention.

Hereinafter, hydraulic drive systems 1, 1A, 1B according to Embodiment 1 to Embodiment 3 of the present invention and a wheel loader 2 including each of the hydraulic drive systems 1, 1A, 1B will be described with reference to the drawings. The stated directions are from the perspective of a driver who steers a wheel loader 2. The directions are used for easier understanding of the description, and are not intended to limit the directions and the like of the constituents of the invention to the described directions. Also, the hydraulic drive systems 1, 1A, 1B and the wheel loader 2 which will be described below are merely the embodiments of the present invention. Therefore, the present invention is not limited to the embodiments, and can be added, deleted and changed within a scope of the invention.

[Wheel Loader]

In construction sites or the like, a variety of work vehicles are practically used to perform a variety of works (operations). The wheel loader 2 is known as one of the work vehicles. The wheel loader 2 includes a bucket 11 which is a work machine, at a front end portion thereof. The wheel loader 2 is able to scoop up and carry dirt, gravel, and others by use of the bucket 11. Although the bucket 11 is exemplary described as the work machine, the work machine is not limited to the bucket, and may be an attachment such as a fork or a snow removing attachment.

The wheel loader 2 configured as described above includes in a vehicle body 12, an engine E (see FIG. 2) and for wheels 13. The wheels 13 are driven by the engine E to rotate, and thus the wheel loader 2 can travel. The vehicle body 12 includes a rear chassis 14 located on rear side and a front chassis 15 located on a front side. The rear chassis 14 and the front chassis 15 are coupled to each other in such a manner that they are rotatable to the right or to the left around an axis which is a center pin 16. Between the rear chassis 14 and the front chassis 15, two steering cylinders 18L, 18R (see FIG. 2) which will be described later are provided to connect the chassis 14 and the chassis 15 to each other. The two steering cylinders 18L, 18R, which are steering actuators, are placed on a left side and aright side, respectively, with respect to the center pin 16. Hydraulic oil is supplied to the steering cylinders 18L, 18R to contract one of the steering cylinders 18L, 18R and extend the other of the steering cylinders 18L, 18R. In this way, the front chassis 15 is turned with respect to the rear chassis 14, and thereby the traveling direction of the wheel loader 2 can be changed.

The engine E is mounted on the rear side of the rear chassis 14. A driver seat 20 is provided in front of the engine E. In contrast, the front chassis 15 is provided with two booms 21 for moving up and down the bucket 11 in such a manner that the booms 21 are spaced apart from each other in a rightward and leftward direction and are vertically rotatable. The two booms 21 are provided with boom cylinders 22, respectively. The hydraulic oil is supplied to the boom cylinders 22, and thereby the booms 21 are moved up and down. The front chassis 15 is provided with a tilt cylinder 23 for vertically tilting the bucket 11. The hydraulic oil is supplied to the tilt cylinder 23, and thereby the bucket 11 is tilted.

In the wheel loader 2 configured as described above, the hydraulic oil is supplied to the steering cylinders 18L, 18R, the boom cylinders 22, and the tilt cylinder 23. Thus, the traveling direction of the vehicle body 12 can be changed and the bucket 11 can be moved up and down, or tilted. The vehicle body 12 of the wheel loader 2 includes a hydraulic drive system 1 to supply the hydraulic oil to the cylinders 18L, 18R, 22, 23 to drive (actuate) the cylinders 18L, 18R, 22, 23.

[Hydraulic Drive System]

Figure 2:
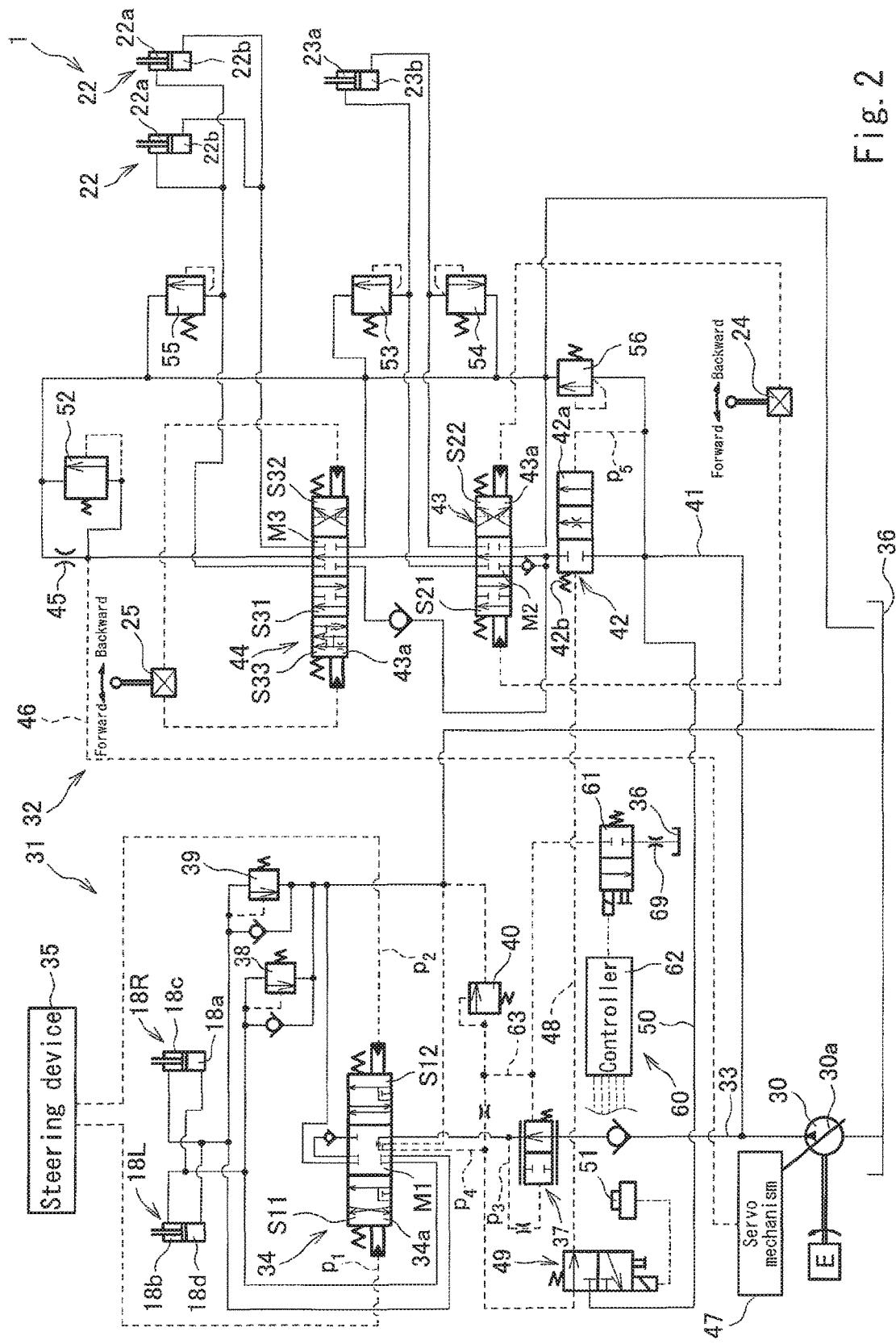
FIG. 2 is a circuit diagram showing a hydraulic circuit of the hydraulic drive system according to Embodiment 1 of the present invention.

As shown in FIG. 2, the hydraulic drive system 1 includes a hydraulic pump 30, a steering drive circuit 31, and a work machine drive circuit 32. The hydraulic pump 30 is a variable displacement pump and is coupled to the engine E. The hydraulic pump 30 is driven by the engine E to rotate. By the rotation of the hydraulic pump 30, the hydraulic pump 30 discharges the hydraulic oil with a high pressure. The steering drive circuit 31 and the work machine drive circuit 32 are connected in parallel to the hydraulic pump 30. The hydraulic oil discharged from the hydraulic pump 30 flows in parallel to the steering drive circuit 31 and the work machine drive circuit 32.

[Steering Control Circuit]

The steering drive circuit 31 includes a meter-in passage 33 connected to the hydraulic pump 30. The hydraulic oil discharged from the hydraulic pump 30 flows to the meter-in passage 33. The meter-in passage 33 is provided with a steering control valve 34. The hydraulic oil discharged from the hydraulic pump 30 is guided to the steering control valve 34.

The steering control valve 34 is connected to the steering cylinders 18L, 18R. The hydraulic oil guided to the meter-in passage 33 flows to the steering cylinders 18L, 18R via the steering control valve 34. The steering control valve 34 includes a main spool 34a. The main spool 34a is moved to change its position, and thereby the direction of the hydraulic oil flowing to the steering cylinders 18L, 18R is switched (changed). The steering control valve 34 is configured to adjust the opening degree of the main spool 34a according to the position of the main spool 34a. The hydraulic oil flows to the steering cylinders 18L, 18R at a flow rate corresponding to this opening degree.

The main spool 34a of the steering control valve 34 configured as described above is connected to a steering device 35. The steering device 35 includes a handle which is capable of performing a rotational operation (not shown, hereinafter will be referred to the handle). The steering device 35 is configured to output first pilot oil and second pilot oil according to a direction in which the handle is rotated. The main spool 34a is configured to receive a pilot pressure $p_1$ of the first pilot oil output from the steering device 35 and a pilot pressure $p_2$ of the second pilot oil output from the steering device 35, in directions in which these pressures face each other. When the main spool 34a receives the first pilot pressure $p_1$, the main spool 34a is moved from a neutral position M1 to a first offset position S11, while when the main spool 34a receives the second pilot pressure $p_2$, the main spool 34a is moved from the neutral position M1 to a second offset position S12.

When the main spool 34a is moved to the first offset position S11, the meter-in passage 33 is connected to a base end chamber 18a of the right steering cylinder 18R and a tip end chamber 18b of the left steering cylinder 18L, while a tank 36 is connected to a tip end chamber 18c of the right steering cylinder 18R and a base end chamber 18d of the left steering cylinder 18L. Thereby, the right steering cylinder 18R is extended and the left steering cylinder 18L is contracted, so that the front chassis 15 faces the left with respect to the rear chassis 14, and the traveling direction is switched (changed).

On the other hand, when the main spool 34a is moved to the second offset position S12, the meter-in passage 33 is connected to the tip end chamber 18c of the right steering cylinder 18R and the base end chamber 18d of the left steering cylinder 18L, while the tank 36 is connected to the base end chamber 18a of the right steering cylinder 18R and the tip end chamber 18b of the left steering cylinder 18L. Thereby, the left steering cylinder 18L is extended and the right steering cylinder 18R is contracted, so that the front chassis 15 faces the right with respect to the rear chassis 14, and the traveling direction is switched (changed).

The steering device 35 is configured to output the first pilot oil and the second pilot oil at a flow rate corresponding to the rotational speed of the handle. The first pilot pressure $p_1$ is increased according to the flow rate of the first pilot oil, and the second pilot pressure $p_2$ is increased according to the flow rate of the second pilot oil. With the increases in the first pilot pressure $p_1$ and the second pilot pressure $p_2$, the opening degree of the main spool 34a is increased, and the flow rate of the hydraulic oil flowing to the steering cylinders 18L, 18R via the steering control valve 34 is increased. In this configuration, the steering cylinder 18L, 18R is extended or contracted at a speed corresponding to the rotational speed of the handle, and the traveling direction is switched (changed). Further, to adjust the flow rate of the hydraulic oil flowing to the steering cylinders 18L, 18R, the steering drive circuit 31 includes a meter-in compensator 37.

The meter-in compensator 37 is provided on the meter-in passage 34 at a location that is upstream of the steering control valve 34. The meter-in compensator 37 is configured to receive as inputs an inlet pressure $p_3$ of the steering control valve 34 and an outlet pressure $p_4$ of the steering control valve 34. The outlet pressure $p_4$ of the steering control valve 34 is an oil pressure output according to the opening degree of the main spool 34a, and is increased with an increase in the opening degree of the main spool 34a. More specifically, the outlet pressure $p_4$ of the steering control valve 34 is increased with an increase in the pressure of the hydraulic oil flowing to the steering actuator. The meter-in compensator 37 is configured to receive as inputs the two pressures $p_3$, $p_4$ in directions in which these pressures face each other. The meter-in compensator 37 is a flow rate control valve, and is configured to control the flow rate of the hydraulic oil flowing from the hydraulic pump 30 to the steering control valve 34, based on an opening degree corresponding to a differential pressure between the two pressures $p_3$, $p_4$.

The steering drive circuit 31 is further provided with three relief valves 38 to 40. The first and second relief valves 38, 39 are configured to discharge to the tank 36, the hydraulic oil flowing through the passages connecting the steering control valve 34 to the chambers 18a to 18d of the steering cylinders 18L, 18R. When a pressure in the passages becomes equal to or higher than a predetermined value. The main relief valve 40 which is the third relief valve is configured to discharge to the tank 36, the pilot oil flowing from the steering control valve 34 to the meter-in compensator 37, when the outlet pressure $p_4$ of the steering control valve 34 becomes equal to or higher than a preset pressure. The three relief valves 38 to 40 serve to keep the pressure of the hydraulic oil at the set pressure by limiting the flow rate of the hydraulic oil flowing to the steering cylinders 18L, 18R to prevent the pressure of the hydraulic oil flowing to the steering cylinders 18L, 18R from becoming equal to or higher than a specified pressure.

<Work Machine Drive Circuit>

The work machine drive circuit 32 includes a bleed-off passage 41. The upstream portion of the bleed-off passage 41 is connected to the meter-in passage 33 at a location that is upstream of the meter-in compensator 37. In this configuration, the hydraulic oil discharged from the hydraulic pump 30 is guided to the meter-in passage 33 and the bleed-off passage 41. The bleed-off passage 41 is provided with a tilt control valve 43, a boom control valve 44, and a throttle 45 which are arranged in this order from the upstream side to the downstream side. A portion of the bleed-off passage 41 which is downstream of the throttle 45 is connected to the tank 36.

The tilt control valve 43 which is an actuator control valve is connected to a tilt cylinder 23. The tilt control valve 43 is configured to switch (change) the flow of the hydraulic oil in the bleed-off passage 41 toward the tilt cylinder 23, and thus the tilt cylinder 23 is actuated. Specifically, the tilt control valve 43 includes a tilt spool 43a. When a tilt lever 24 provided in the driver seat 20 is operated, the tilt spool 43a is moved from the neutral position M2 and its position changed. The tilt control valve 43 is configured to switch (change) the direction of the hydraulic oil flowing in the bleed-off passage 41 by the change in the position of the tilt spool 43a.

More specifically, when the tilt lever 24 is operated and the tilt spool 43a is moved from the neutral position M2 to a first offset position S21, the hydraulic oil is guided to the tip end chamber 23a of the tilt cylinder 23, the tilt cylinder 23 is contracted, and the bucket 11 is tilted in a downward direction. On the other hand, when the tilt lever 24 is operated and the tilt spool 43a is moved from the neutral position M2 to a second offset position S22, the hydraulic oil is guided to the base end chamber 23b of the tilt cylinder 23, the tilt cylinder 23 is extended, and the bucket 11 is tilted in an upward direction. Further, when the tilt spool 43a is returned to the neutral position M2, the bleed-off passage 41 and the tilt cylinder 23 are disconnected from each other.

The tilt control valve 43 configured as described above is a center-open direction-switching valve. When the tilt spool 43a is at the neutral position M2, the tilt control valve 43 is opened, namely, the bleed-off passage 41 is opened, and its opening degree is greatest. When the tilt spool 43a is moved from the neutral position M2 toward the first offset position S21 or the second offset position S22, the opening degree of the tilt control valve 43, namely the opening degree of the bleed-off passage 41, is reduced according to the movement amount of the tilt spool 43a. Because of this, the amount of the hydraulic oil flowing to a portion of the bleed-off passage 41 which is downstream of the tilt control valve 43, is reduced with an increase in the operation amount of the tilt lever 24, and is increased when the tilt lever 24 is returned to its original position. In the bleed-off passage 41 which is opened and closed as described above, a boom control valve 44 is located downstream of the tilt control valve 43.

The boom control valve 44 which is the actuator control valve is connected to the boom cylinder 22. The boom control valve 44 is configured to switch (change) the flow of the hydraulic oil in the bleed-off passage 41 toward the boom cylinder 22 to drive (actuate) the boom cylinder 22. Specifically, the boom control valve 44 includes a boom spool 44a. When an up-down lever 25 provided in the driver seat 20 is operated, the boom spool 44a is moved from a neutral position M3, and its position is changed. The boom spool 44a is configured to switch (change) the direction of the hydraulic oil in the bleed-off passage 41 by the change in the position of the boom spool 44a.

More specifically, when the up-down lever 25 is operated and the boom spool 44a is moved from the neutral position M3 to a first offset position S31, the hydraulic oil is guided to the tip end Chambers 22a of the boom cylinders 22, the boom cylinders 22 are contracted, and the bucket 11 is moved in a downward direction. On the other hand, when the up-down lever 25 is operated and the boom spool 44a is moved from the neutral position M3 to a second offset position S32, the hydraulic oil is guided to the base end chambers 22b of the boom cylinders 22, the boom cylinders 22 are extended, and the bucket 11 is moved in an upward direction.

When the up-down lever 25 is further operated, the boom spool 44a of the boom control valve 44 can be moved from the first offset position S31 to a third offset position S33. In a state in which the boom spool 44a is at the third offset position S33, the tip end chambers 22a and the base end chambers 22b of the boom cylinders 22 are connected to the tank 36. In this state, a holding force of the boom cylinders 22 do not work, and the bucket 11 is moved down by its own weight.

The boom control valve 44 configured as described above is a center-open direction-switching valve. When the boom spool 44a is at the neutral position M3, the bleed-off passage 41 is opened, and its opening degree is greatest. When the boom spool 44a is moved from the neutral position M3 toward the first offset position S31 or the second offset position S32, the opening degree of the bleed-off passage 41 is reduced according to the movement amount of the boom spool 44a. Because of this, the amount of the hydraulic oil flowing to a portion of the bleed-off passage 41 which is downstream of the boom control valve 44 is reduced with an increase in the operation amount of the up-down lever 25, and is increased when the up-down lever 25 is returned to its original position. In the bleed-off passage 41 which is opened and closed as described above, the throttle 45 is located downstream of the boom control valve 44.

The throttle 45 is located between the boom control valve 44 and the tank 36, in the bleed-off passage 41. The hydraulic oil which has passed through the tilt control valve 43 and the boom control valve 44 is discharged to the tank 36 via the throttle 45. For this reason, in a portion of the bleed-off passage 41 which is upstream of the throttle 45, a pressure corresponding to the flow rate of the hydraulic oil which has passed through the tilt control valve 43 and the boom control valve 44 and is guided to the throttle 45 is generated. Between the throttle 45 and the boom control valve 44, a negative control passage 46 is provided and connected to the throttle 45 and the boom control valve 44. The pressure generated in the portion of the bleed-off passage 41 which is upstream of the throttle 45 is guided as a tilt command signal to a servo mechanism 47 of the hydraulic pump 30 via the negative control passage 46.

As described above, the hydraulic pump 30 is the variable displacement hydraulic pump. The hydraulic pump 30 includes a skew plate 30a. By tilting the skew plate 30a, the displacement of the hydraulic pump 30 is variable. The servo mechanism 47 is configured to control the tilt angle of the skew plate 30a of the hydraulic pump 30, in response to the tilt command signal. Specifically, the servo mechanism 47 decreases the tilt angle of the skew plate 30a and decreases the displacement of the hydraulic pump 30, when the pressure of the tilt command signal becomes high. Thereby, the discharge amount of the hydraulic pump 30 is reduced. On the other hand, the servo mechanism 47 increases the tilt angle of the skew plate 30a and increases the displacement of the hydraulic pump 30, when the pressure of the tilt command signal becomes low. Thereby, the discharge amount of the hydraulic pump 30 is increased.

As described above, in the work machine drive circuit 32, the discharge amount of the hydraulic pump 30 is controlled according to the flow rate of the hydraulic oil flowing to the throttle 45. In other words, the discharge amount of the hydraulic pump 30 is controlled by a negative control. Further, the work machine drive circuit 32 includes a bleed-off compensator 42 to adjust the flow rate of the hydraulic oil which has been discharged from the hydraulic pump 30 and is flowing to the steering drive circuit 31, namely, to control the flow rate of the hydraulic oil which is bled-off from the hydraulic pump 30 to the bleed-off passage 41.

The bleed-off compensator 42 is provided in the bleed-off passage 41 at a location that is upstream of the tilt control valve 43. The bleed-off compensator 42 is configured to receive as pilot pressures an inlet pressure $p_5$ of the bleed-off compensator 42 and the outlet pressure $p_4$ of the steering control valve 34 in directions in which these pressures face each other. The bleed-off compensator 42 is a flow rate control valve including a spool 42a. The spool 42a is moved to a position corresponding to a differential pressure between the inlet pressure $p_5$ and the outlet pressure $p_4$. Based on the opening degree corresponding to the position of the spool 42a, the flow rate of the hydraulic oil which is bled-off to a portion of the bleed-off passage 41 which is downstream of the bleed-off compensator 42 is controlled.

Between the steering drive circuit 31 and the work machine drive circuit 32, a first bypass passage 48 is provided. Through this first bypass passage 48, the outlet pressure $p_4$ of the steering control valve 34 is guided to the bleed-off compensator 42. The first bypass passage 48 is provided with an electromagnetic switching valve 49. The electromagnetic switching valve 49 is connected to a second bypass passage 50. The electromagnetic switching valve 49 is connected to a portion of the bleed-off passage 41 which is upstream of the bleed-off compensator 42, via the second bypass passage 50. The electromagnetic switching valve 49 is electrically connected to an operation button 51. When the operation button 51 is operated, the electromagnetic switching valve 49 switches the pilot pressure input to the bleed-off compensator 42 from the outlet pressure $p_4$ of the steering control valve 34 to the inlet pressure $p_5$ of the bleed-off compensator 42. For this reason, when the operation button 51 is operated, the differential pressure between the two pilot pressures input to the bleed-off compensator 42 becomes zero. The spool 42a of the bleed-off compensator 42 is biased in a direction to close the bleed-off passage 41 by a spring 42b. Thus, the bleed-off passage 41 is forcibly closed.

The work machine drive circuit 32 configured as described above includes a plurality of relief valves 52 to 55. The relief valve 52 is provided in parallel with the throttle 45 in the bleed-off passage 41. When a pressure in a portion of the bleed-off passage 41 which is upstream of the throttle 45 becomes equal to or higher than a predetermined pressure, the hydraulic oil flowing through this upstream portion is discharged to the tank 36 via the relief valve 52. The relief valves 53 to 55 are connected between the tilt control valve 43 and the tip end chamber 23a of the tilt cylinder 23, between the tilt control valve 43 and the base end chamber 23b of the tilt cylinder 23, and between the boom control valve 44 and the tip end chamber 22a of the boom cylinder 22. These three relief valves 53 to 55 are configured to discharge the hydraulic oil to the tank 36 when hydraulic pressures in the passages become equal to or higher than a predetermined pressure.

Further, the work machine drive circuit 32 includes a main relief valve 56. The main relief valve 56 is provided in parallel with the bleed-off compensator 42. The main relief valve 56 is configured to discharge the hydraulic oil from the hydraulic pump 30 to the tank 36 when the discharge pressure of the hydraulic pump 30 becomes equal to or higher than a predetermined pressure. The main relief valve 56 is able to keep the pressure of the hydraulic oil flowing from the hydraulic pump 30 to the work machine drive circuit 32 at a pressure that is lower than a specified pressure.

[Operation of Hydraulic Drive System]

In the hydraulic drive system 1 configured as described above, the engine E rotates the hydraulic pump 30 and thereby the hydraulic pump 30 discharges the hydraulic oil. The hydraulic oil flows in parallel to the steering drive circuit 31 and the work machine drive circuit 32. In a state in which the handle of the steering device 35 is not operated, the steering control valve 34 is closed to disconnect the meter-in passage 33 and the steering cylinders 18L, 18R, and the outlet pressure $p_4$ of the steering control valve 34 is low. In this state, the meter-in compensator 37 operates to close the meter-in passage 33, and thus the flow rate of the hydraulic oil flowing to the steering control valve 34 is limited.

In contrast, in the work machine drive circuit 32, in a state in which the operation button 51 is not operated, the outlet pressure $p_4$ of the steering control valve 34 becomes low. Thereby, the spool 42a of the bleed-off compensator 42 is moved in a direction to open the bleed-off passage 41, and the hydraulic oil flows to a portion of the bleed-off passage 41 which is downstream of the spool 42a. In this situation, if the tilt lever 24 or the up-down lever 25 is operated, the spool 43a, 44a of the control valve 43, 44 corresponding to the operated lever is moved from the neutral position M2, M3, and the hydraulic oil is guided to the corresponding cylinder 23, 22. Thereby, the bucket 11 is moved up and down, or tilted, according to the operated lever. Since the spool 43a, 44a of the control valve 43, 44 is moved from the neutral position M2, M3, the opening degree of the bleed-off passage 41 is reduced, and the flow rate of the hydraulic oil flowing to the throttle 45 is reduced. Thereby, the pressure of the tilt command signal is reduced, and the servo mechanism 47 increases the tilt angle of the skew plate 30a of the hydraulic pump 30 in response to the tilt command signal to increase the discharge amount of the hydraulic pump 30. On the other hand, when the tilt lever 24 or the up-down lever 25 is not operated, and the spool 43a, 44a is returned to the neutral position M2, M3, the flow rate of the hydraulic oil flowing to the throttle 45 is increased. Thereby, the pressure of the tilt command signal is increased, and the servo mechanism 47 reduces the tilt angle of the skew plate 30a of the hydraulic pump 30 in response to the tilt command signal to reduce the discharge amount of the hydraulic pump 30.

When the handle of the steering device 35 is operated, the main spool 34a of the steering control valve 34 is moved from the neutral position M1 according to the operation amount of the handle. Thereby, the outlet pressure $p_4$ of the steering control valve 34 is increased, and the meter-in compensator 37 is moved in the direction to open the meter-in passage 33. Thereby, the hydraulic oil from the hydraulic pump 30 is guided to the steering cylinders 18L, 18R via the steering control valve 34, so that the steering cylinder 18L, 18R is extended or contracted. In this way, the traveling direction of the wheel loader 2 is switched (changed) into a direction according to the rotational direction of the handle.

In the work machine drive circuit 32, in a state in which the operation button 51 is not operated, the outlet pressure $p_4$ of the steering control valve 34 is increased. Thereby, the spool 42a of the bleed-off compensator 42 is moved in a direction to close the bleed-off passage 41, and the flow rate of the hydraulic oil flowing to a portion of the bleed-off passage 41 which is downstream of the bleed-off compensator 42 is limited. Since the flow rate of the hydraulic oil is limited in this way, the flow rate of the hydraulic oil which is bled-off from the meter-in passage 33 to the bleed-off passage 41 can be suppressed. In other words, the hydraulic oil can be flowed to the steering drive circuit 31 preferentially. As a result, the steering cylinders 18L, 18R can be moved preferentially over the bucket 11.

Since the flow rate of the hydraulic oil flowing to a portion of the bleed-off passage 41 which is downstream of the bleed-off compensator 42 is limited, the flow rate of the hydraulic oil flowing to a portion of the bleed-off passage 41 which is upstream of the throttle 45 is reduced, and hence, a pressure generated in a portion of the bleed-off passage 41 which is upstream of the throttle 45 is reduced. In other words, the pressure of the tilt command signal is reduced and the discharge amount of the hydraulic pump 30 is increased. As a result, the hydraulic oil is discharged from the hydraulic pump 30 at a flow rate that is slightly higher than that required for the steering control valve 34, and the hydraulic oil can be stably supplied to the steering cylinders 18L, 18R.

After that, an outlet pressure $p_3$ of the meter-in compensator 37 continues to be increased with an increase in the opening degree of the meter-in compensator 37. However, when the outlet pressure $p_4$ of the steering control valve 34 becomes equal to or higher than the set pressure, the main relief valve 40 is opened to keep the outlet pressure $p_4$ at a pressure which is equal to or lower than the set pressure. For this reason, as the outlet pressure $p_3$ of the meter-in compensator 37 is increased, the meter-in compensator 37 is moved in a direction to close the meter-in passage 33, and hence the flow rate of the hydraulic oil flowing to the steering cylinders 18L, 18R is limited. Therefore, a maximum pressure of the hydraulic oil flowing to the steering cylinders 18L, 18R is limited to a predetermined pressure corresponding to the set pressure. Since the flow rate of the hydraulic oil flowing to the meter-in passage 33 is reduced, and the flow rate of the hydraulic oil flowing to the bleed-off passage 41 is increased, a circuit pressure of the bleed-off passage 41 is increased (the inlet pressure $p_5$ of the bleed-off compensator 42 is increased), and the spool 42 of the bleed-off compensator 42 is moved in the direction to open the bleed-off passage 41. Therefore, the flow rate of the hydraulic oil which is bled-off to the bleed-off passage 41 is increased. As a result, the flow rate of the hydraulic oil flowing from the hydraulic pump 30 to the meter-in compensator 37 is limited to one that is lower than the predetermined pressure.

Further, in the hydraulic drive system 1, when the operation button 51 is operated, the electromagnetic switching valve 49 operates to switch the pilot pressure applied to the bleed-off compensator 42 from the outlet pressure $p_4$ of the steering control valve 34 to the inlet pressure $p_5$ of the bleed-off compensator 42. Thus, the bleed-off passage 41 is forcibly closed by the bleed-off compensator 42. Since the bleed-off passage 41 is forcibly closed, the servo mechanism 47 increases the discharge amount of the hydraulic pump 30, and an oil pressure in the meter-in passage 33 and an oil pressure in the bleed-off passage 41 are increased. When a hydraulic pressure in the bleed-off passage 41 becomes equal to or higher than the specified pressure, the main relief valve 56 is opened, and the hydraulic oil is discharged from the bleed-off passage 41 to the tank 36. Since the bleed-off passage 41 is forcibly closed and he hydraulic oil is discharged from the main relief valve 56 in the above-described manner, a load can be applied to the engine E. If the handle of the steering device 35 is operated while the operation button 51 is operated, the meter-in compensator 37 is moved to open the meter-in passage 33 as in a case where the operation button 51 is not operated, and thereby the hydraulic oil is preferentially flowed to the steering drive circuit 31.

In the hydraulic drive system 1 configured as described above, when the handle of the steering device 35 is operated, the hydraulic oil is preferentially flowed to the steering drive circuit 31, and the steering cylinders 18L, 18R are moved according to the operation of the handle, irrelevantly to whether or not the bucket 11 is operated. In brief, the responsivity of the steering cylinders 18L, 18R to the operation of the handle is high. Because of this high responsivity of the steering cylinders 18L, 18R, the wheel loader 2 cannot travel straight well during high-speed traveling, in some cases. To avoid this, the hydraulic drive system 1 includes a flow rate control (adjustment) means 60 which allows the wheel loader 2 to travel straight during high-speed traveling.

<Flow Rate Control Means>

The flow rate control means 60 is configured to determine whether or not the state of the wheel loader 2 meets a steering limiting condition. The flow rate control means 60 is configured to reduce the flow rate of the hydraulic oil owing to the steering cylinders 18L, 18R in such a manner that the flow rate becomes lower than that corresponding to the operation amount of the handle of the steering device 35, when the flow rate control means 60 determines that the state of the wheel loader 2 meets the steering limiting condition. In this way, the responsivity of the steering cylinders 18L, 18R to the operation of the handle is lowered, and as a result, the wheel loader 2 can travel straight during high-speed traveling.

This will be described specifically. The flow rate control means 60 includes an outlet pressure switching valve 61, and a controller 62. The outlet pressure switching valve 61 which is a flow rate control (adjustment) mechanism is connected to a pilot passage 63 connecting the bypass passage 48 to the meter-in compensator 37. The outlet pressure $p_4$ of the steering control valve 34 is guided to the pilot passage 63 via the bypass passage 48. The outlet pressure $p_4$ of the steering control valve 34 which is guided to the pilot passage 63 is input to the meter-in compensator 37 as the pilot pressure. The pilot passage 63 is connected to the tank 36 via the outlet pressure switching valve 61.

The outlet pressure switching valve 61 is an electromagnetic switching valve. The outlet pressure switching valve 61 is configured to connect the pilot passage 63 and the tank 36 to each other or disconnect the pilot passage 63 and the tank 36 from each other, in response to a command signal (flow rate limiting command) input to the outlet pressure switching valve 61. Between the outlet pressure switching valve 61 and the tank 36, a throttle 69 is provided. The throttle 69 serves to limit the flow rate of the pilot oil flowing from the pilot passage 63 to the tank 36 via the outlet pressure switching valve 61. The outlet pressure switching valve 61 is electrically connected to the controller 62, and is configured to receive the command signal from the controller 62 as an input.

Figure 3:
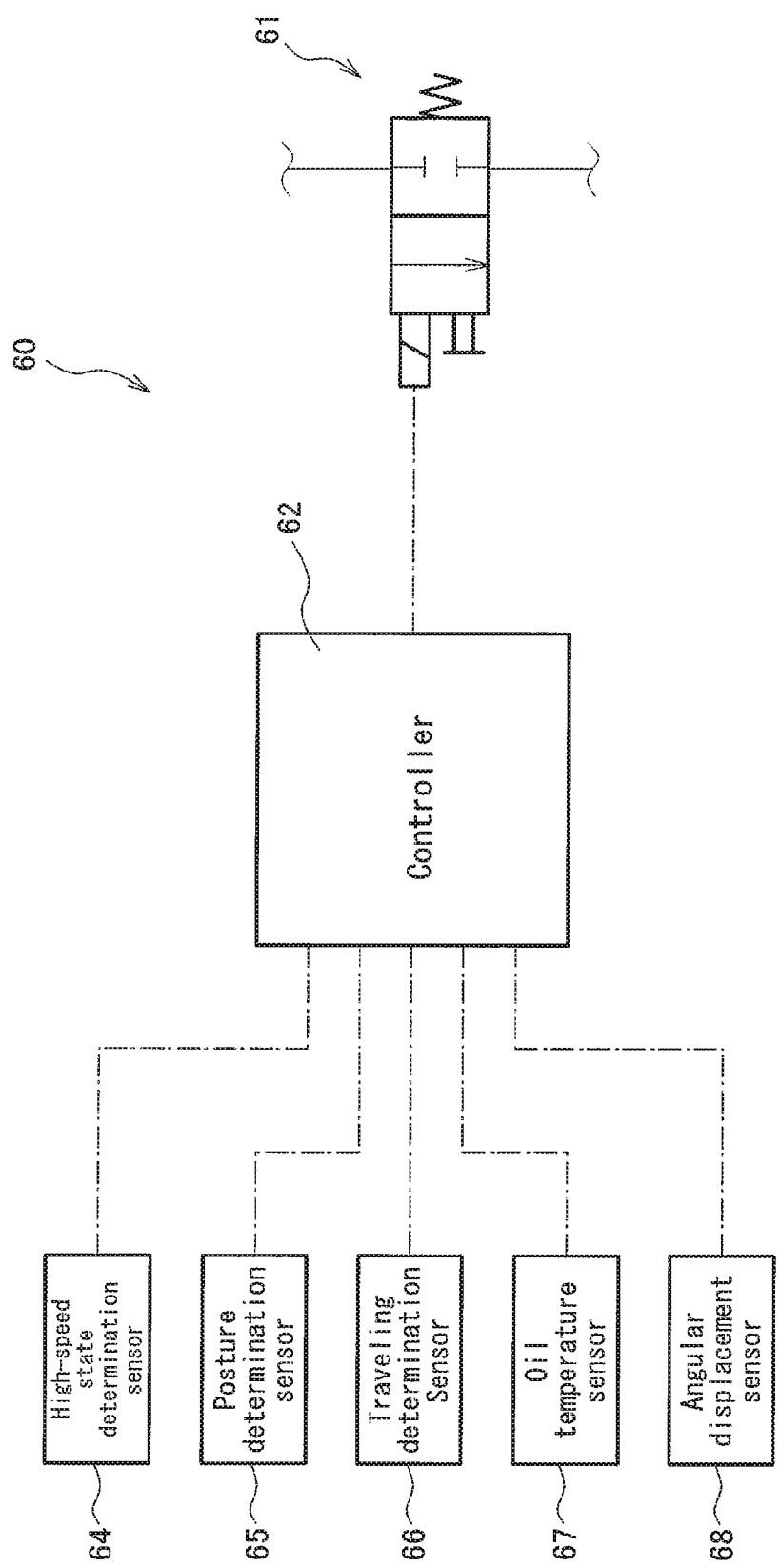
FIG. 3 is a diagram showing the electric configuration of the hydraulic drive system of FIG. 2.

The controller 62 which is a control device is configured to determine whether or not the state of the wheel loader 2 meets the steering limiting condition. The steering limiting condition includes a condition in which the wheel loader 2 has an operational posture, a condition in which the wheel loader 2 is traveling, and a condition in which the wheel loader 2 is in a high-speed state. The steering limiting condition need not include all of the above-described three conditions. It is sufficient that the steering limiting condition includes at least the condition in which the wheel loader 2 is in a high-speed state. As shown in FIG. 3, to determine whether or not the state of the wheel loader 2 meets the steering limiting condition, three sensors 64, 64, 66 which are vehicle state detecting units, to be precise, the high-speed state determination sensor 64, the posture determination sensor 65, and the traveling determination sensor 66 are electrically connected to the controller 62.

The high-speed state determination sensor 64 is a sensor used to determine whether or not the wheel loader 2 is traveling at a high-speed. The high-speed state determination sensor 64 is, for example, a vehicle speed sensor, and is configured to output a signal used to detect the vehicle speed of the wheel loader 2, to the controller 62. The controller 62 is configured to detect the speed of the wheel loader 2, namely, the vehicle speed, based on the signal output from the vehicle speed sensor and to determine whether or not the wheel loader 2 is in a high-speed state, based on the detected vehicle speed. Alternatively, the high-speed state determination sensor 64 may be a transmission gear position detecting sensor, or an accelerator pedal operation amount sensor. The controller 62 may be configured to detect a transmission gear position or an accelerator pedal operation amount based on the signal output from the transmission gear position detecting sensor, or the accelerator pedal operation amount sensor, and determine whether or not the wheel loader 2 is in a high-speed state based on a result of the detection.

The posture determination sensor 65 is a sensor used to determine whether or not the wheel loader 2 has an operational posture. The posture determination sensor 65 is, for example, an angular sensor of the boom 21, and is configured to output a signal used to detect the rotational angle of the boom 21 to the controller 62. The controller 62 is configured to detect the rotation of the boom 21 based on a signal output from the angular sensor, and determine whether or not the wheel loader 2 has an operational posture based on the detected rotational angle. Alternatively, the posture determination sensor 65 may be an angular sensor for detecting the position of the bucket 11, or a pressure sensor for detecting the holding pressure of the boom cylinder 22 or the tilt cylinder 23. The controller 62 may be configured to detect the rotational angle or the holding pressure of the boom 21, based on a signal output from the angular sensor or the pressure sensor and determine whether or not the wheel loader 2 has an operational posture based on a result of the detection.

The traveling determination sensor 66 is a sensor used to determine whether or not the wheel loader 2 is traveling. The traveling determination sensor 66 includes, for example, an engine speed sensor for detecting the engine speed of the engine E and a rotational speed sensor for detecting the output rotational speed of a torque converter. The torque converter is a driving force transmission mechanism for transmitting the output torque of the engine E to the wheels 13. These two sensors are configured to output to the controller 62, signals used to detect the engine speed of the engine E and the output rotational speed of the torque converter, namely, the rotational speed on the input side of the torque converter and the rotational speed on the output side of the torque converter. The controller 62 is configured to calculate a speed ratio between the rotational speed on the input side of the torque converter and the rotational speed on the output side of the torque converter, based on the signals output from the sensors, and determine whether or not the wheel loader 2 is traveling based on the calculated speed ratio.

Instead of the above-described two rotational speed sensors, the traveling determination sensor 66 may include a pressure sensor for detecting a release pressure or brake pressure of a parking brake included in the wheel loader 2, and a forward/backward traveling detecting sensor. The controller 62 may be configured to determine whether or not the wheel loader 2 is traveling, based on a signal output from the pressure sensor or the forward/backward traveling detecting sensor. Alternatively, the traveling determination sensor 66 may be a vehicle speed sensor. The controller 62 may be configured to determine whether or not the wheel loader 2 is traveling, based on a signal output from the vehicle speed sensor. An oil temperature sensor 67 and an angular displacement sensor 68 for the handle are electrically connected to the controller 62 in addition to the above-described sensors 64 to 66. The oil temperature sensor 67 which is the vehicle state detecting unit is a sensor used to detect the temperature of the hydraulic oil discharged from the hydraulic pump 30. The oil temperature sensor 67 is connected to, for example the tank 36. The oil temperature sensor 67 is configured to output a signal used to detect the temperature of the hydraulic oil to the controller 62. The controller 62 is configured to detect the temperature of the hydraulic oil based on a signal output from the oil temperature sensor 67. The angular displacement sensor 68 for the handle which is the vehicle state detecting unit is provided on the handle of the steering device 35 and is a sensor used to detect the angular displacement amount of the handle. The angular displacement sensor 68 is configured to output a signal used to detect the angular displacement amount of the handle to the controller 62. The controller 62 is configured to detect the rotational speed of the handle based on a signal output from the angular displacement sensor 68.

The controller 62 configured as described above is configured to determine whether or not the state of the wheel loader 2 meets the steering limiting condition, based on the signals output from the sensors 64 to 66. In addition, the controller 62 is configured to determine whether or not the state of the wheel loader 2 meets a steering limiting inhibiting condition which will be described below, based on the detected oil temperature and handle rotational speed, and the vehicle speed of the wheel loader 2 detected based on the signal output from the high-speed state determination sensor 64. Further, the controller 62 is configured to output a command signal to the outlet pressure switching valve 61 depending on whether or not the state of the wheel loader 2 meets the steering limiting condition and whether or not the state of the wheel loader 2 meets the steering limiting inhibiting condition.

<High-Speed Steering Control>

Figure 4:
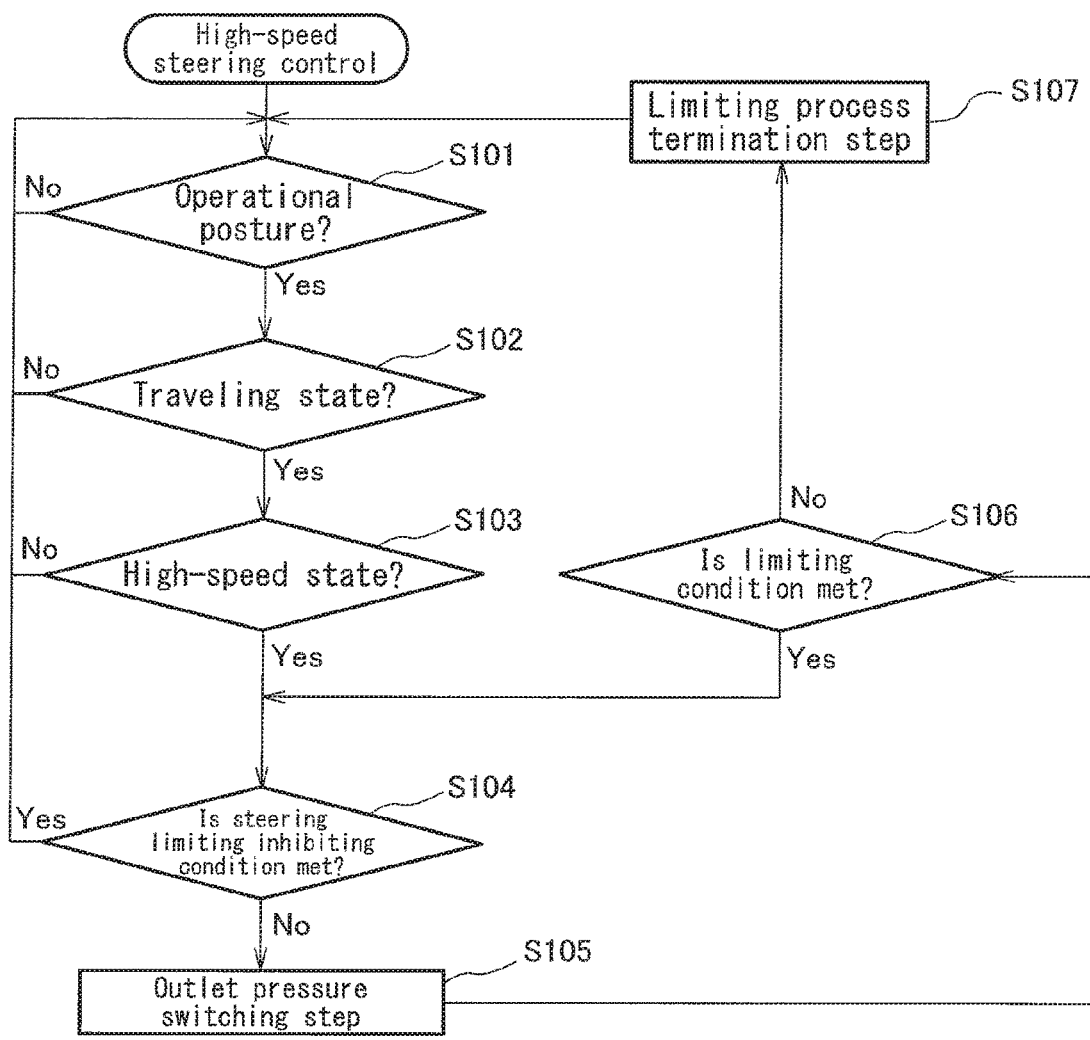
FIG. 4 is a flowchart showing a procedure for a high-speed steering control executed by the hydraulic drive system of FIG. 2.

Hereinafter, the high-speed steering control performed by the flow rate control means 60 will be described with reference to FIG. 4. The high-speed steering control is initiated when a power supply of the wheel loader 2 is turned on. Initially, the process shifts to step S101. Steps S101 to S103 are a determination process in which the controller 62 determines whether or not the state of the wheel loader 2 meets the steering limiting condition. The order of the steps performed to determine whether or not the state of the wheel loader 2 meets the steering limiting condition is not limited to the order which will be described below, but may be set as desired.

In the step S101 which is an operational posture determination step, the controller 62 determines whether or not the wheel loader 2 has an operational posture. Specifically, the controller 62 detects the rotational angle of the boom 21 based on the signal output from the posture determination sensor 65, and determines whether or not the detected rotational angle falls within a predetermined threshold range. When the controller 62 determines that the detected rotational angle falls outside the predetermined threshold range, the controller 62 determines that the wheel loader 2 has a work posture, for example, the wheel loader 2 is performing an excavation work or a loading work. The controller 62 determines whether or not the wheel loader 2 has an operational posture, again. On the other hand, when the controller 62 determines that the detected rotational angle falls within the predetermined threshold range, the controller 62 determines that the wheel loader 2 has an operational posture in which the wheel loader 2 is operational at a high speed, and the process shifts to the step S102.

In the step S102 which is a traveling state determination step, the controller 62 determines whether or not the wheel loader 2 is in a traveling state, namely, the wheel loader 2 is traveling. Specifically, the controller 62 calculates the speed ratio between the rotational speed on the input side of the torque converter and the rotational speed on the output side of the torque converter, based on the signals output from the traveling determination sensor 66, and determines whether or not the speed ratio is equal to or greater than a predetermined threshold (e.g., equal to or greater than 0.4). When the controller 62 determines that the speed ratio is equal to or less than the predetermined threshold, the controller 62 determines that the wheel loader 2 is performing a work or is not traveling, and the process returns to the step S101. On the other hand, when the controller 62 determines that the speed ratio is equal to or greater than the predetermined threshold, the controller 62 determines that the wheel loader 2 is traveling, and the process shifts to step S103.

In the step S103 which is a high-speed state determination step, the controller 62 determines whether or not the wheel loader 2 is traveling at a high speed. Specifically, the controller 62 detects the vehicle speed of the wheel loader 2 based on the signal output from the high-speed state determination sensor 64, and determines whether or not the vehicle speed is equal to or higher than a predetermined threshold (e.g., equal to or higher than 20 km/h). When the controller 62 determines that the vehicle speed is equal to or lower than the predetermined threshold, the controller 62 determines that the wheel loader 2 is not traveling at a high speed, and the process returns to the step S101. On the other hand, when the controller 62 determines that the vehicle speed is equal to or higher than the predetermined threshold, the controller 62 determines that the wheel loader 2 is traveling at a high speed. When the controller 62 determines that the state of the wheel loader 2 meets all of the conditions (namely, the wheel loader 2 has an operational posture, the wheel loader 2 is traveling, and the wheel loader 2 is in a high-speed state included in the steering limiting condition, in the step S101 to the step S103, a limiting process is initiated, and the process shifts to step S104.

In the step S104 which is a steering limiting inhibiting condition determination step, the controller 62 determines whether or not the state of the wheel loader 2 meets the steering limiting inhibiting condition. The steering limiting inhibiting condition includes a condition in which the oil temperature T of the hydraulic oil is equal to or lower than T1 (e.g., 20 degrees C.) and a condition in which the rotational speed N of the handle (handle rotational speed N) is equal to or higher than N1 (e.g., 60 rpm). It should be noted that the steering limiting inhibiting condition need not include the two conditions. It is sufficient that the steering limiting inhibiting condition includes at least one of the two conditions. The procedure for the determination will be described specifically. The controller 62 detects the oil temperature T and the handle rotational speed N based on the signal output from the oil temperature sensor 67 and the signal output from the angular displacement sensor 68. Based on these signals, the controller 62 determines whether or not the state of the wheel loader 2 meets at least one of the conditions included in the steering limiting inhibiting condition. When the controller 62 determines that the state of the wheel loader 2 meets at least one of the conditions included in the steering limiting inhibiting condition, the controller 62 does not perform the steering limiting process and the process returns to the step S101. On the other hand, when the controller 62 determines that the state of the wheel loader 2 does not meet at least one of the conditions, the process shifts to step S105.

In the step S105 which is an outlet pressure switching step, the controller 62 outputs a command signal to the outlet pressure switching valve 61. In response to the command signal, the pilot passage 63 is connected to the tank 36 via the outlet pressure switching valve 61, and a portion of the pilot oil flowing through the pilot passage 63 is released to the tank 36 via the throttle 69. Thereby, the outlet pressure $p_4$ of the steering control valve 34 is reduced, and a differential pressure between the outlet pressure $p_4$ of the steering control valve 34 and the inlet pressure $p_3$ of the steering control valve 34 is increased. Therefore, the meter-in compensator 37 reduces the flow rate of the hydraulic oil supplied to the steering control valve 34. Thereby, the flow rate of the hydraulic oil flowing to the main spool 34a can be reduced, and the flow rate of the hydraulic oil flowing to the steering cylinders 18L, 18R can be reduced in such a manner that the flow rate becomes lower than that corresponding to the operation amount of the handle of the steering device 35. In this way, the responsivity of the steering cylinders 18L, 18R to the operation of the handle is lowered, and as a result, the wheel loader 2 can travel straight during high-speed traveling. After the flow rate of the hydraulic oil in the meter-in passage 33 is limited in this way, the process shifts to step S106.

In the step S106 which is a limiting termination determination step, the controller 62 determines whether or not the state of the wheel loader 2 meets the steering limiting condition, again. When the controller 62 determines that the state of the wheel loader 2 meets the steering limiting condition, the process returns to the step S104. On the other hand, when the controller 62 determines that the state of the wheel loader 2 does not meet the steering limiting condition, the process shifts to step S107. In the step S107 which is a limiting termination step, the controller 62 ceases to output the command signal to the outlet pressure switching valve 61, and disconnects the pilot passage 63 and the tank 36 from each other. Thereby, the hydraulic oil flows to the steering cylinders 18L, 18R at a flow rate corresponding to the operation amount of the handle of the steering device 35. When the pilot passage 63 and the tank 36 are disconnected from each other, the process returns to the step S101.

In the hydraulic drive system 1 configured as described above, when the wheel loader 2 becomes the high-speed traveling state and the state of the wheel loader 2 meets the steering limiting condition, the responsivity of the steering cylinders 18L, 18R to the operation of the handle of the steering device 35 is lowered. As a result, the wheel loader 2 can travel straight during high-speed traveling.

In addition, the steering limiting of the responsivity of the steering cylinders 18L, 18R to the operation of the handle is inhibited based on the oil temperature T and the handle rotational speed N. This makes it possible to prevent a situation in which the responsivity is lowered excessively and the steering performance is reduced excessively, due to the oil temperature T, and the handle rotational speed N. Specifically, in a case where the oil temperature T is low, the viscosity of the pilot oil is high, and the responsivity is low. In view of this, by inhibiting the steering limiting, it becomes possible to prevent a situation in which the responsivity is lowered excessively and the steering performance is reduced excessively. More specifically, with an increase in the temperature of the hydraulic oil, the viscosity of the hydraulic oil becomes lower and the responsivity of the steering cylinders 18L, 18R to the operation of the handle of the steering device 35 is varied. However, the flow rate of the hydraulic oil flowing to the steering cylinders 18L, 18R is reduced based on the temperature of the hydraulic oil in such a manner that the flow rate becomes lower than that corresponding to the operation amount of the handle of the steering device 35, and thus, a variation in the responsivity of the steering cylinders 18L, 18R due to the temperature of the hydraulic oil, can be suppressed. Further, in a case where the driver wishes to quickly switch (change) the traveling direction of the wheel loader 2 (namely, the handle rotational speed N is high), the steering limiting is inhibited. In this way, the traveling direction of the wheel loader 2 can be quickly switched (changed) according to the driver's intention.

Embodiment 2

A hydraulic drive system 1A of Embodiment 2 is similar in configuration to the hydraulic drive system 1 of Embodiment 1. Hereinafter, regarding the configuration of the hydraulic drive system 1A of Embodiment 2, differences with the configuration of the hydraulic drive system 1 of Embodiment 1 will be mainly described. The same constituents as those of the hydraulic drive system 1 of Embodiment 1 are designated by the same reference characters and will not be described repeatedly. The same applies to hydraulic drive systems 1B, 1C, 1D of Embodiment 3 to Embodiment 5 which will be described below.

Figure 5:
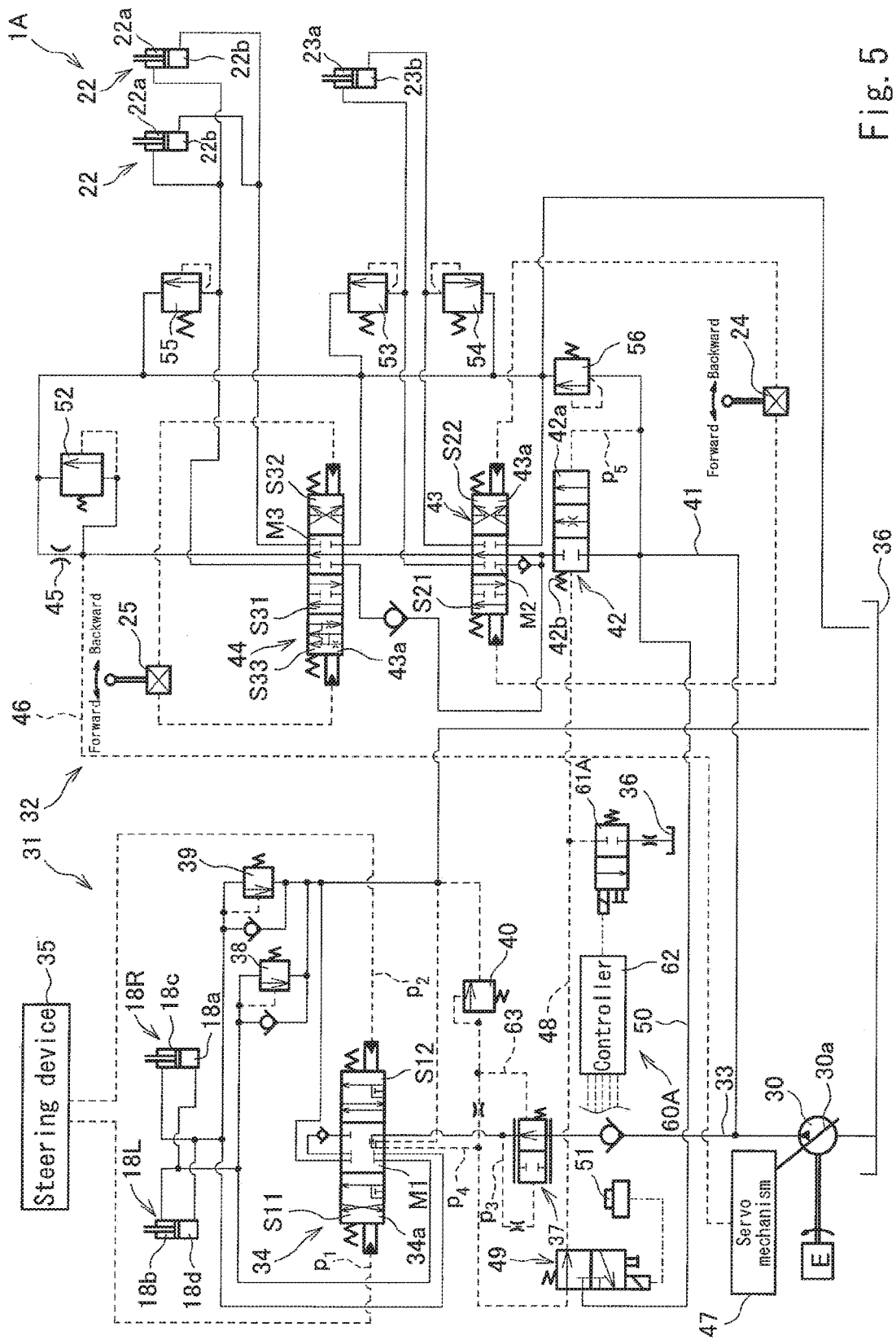
FIG. 5 is a circuit diagram showing a hydraulic circuit of a hydraulic drive system according to Embodiment 2 of the present invention.
Figure 6:
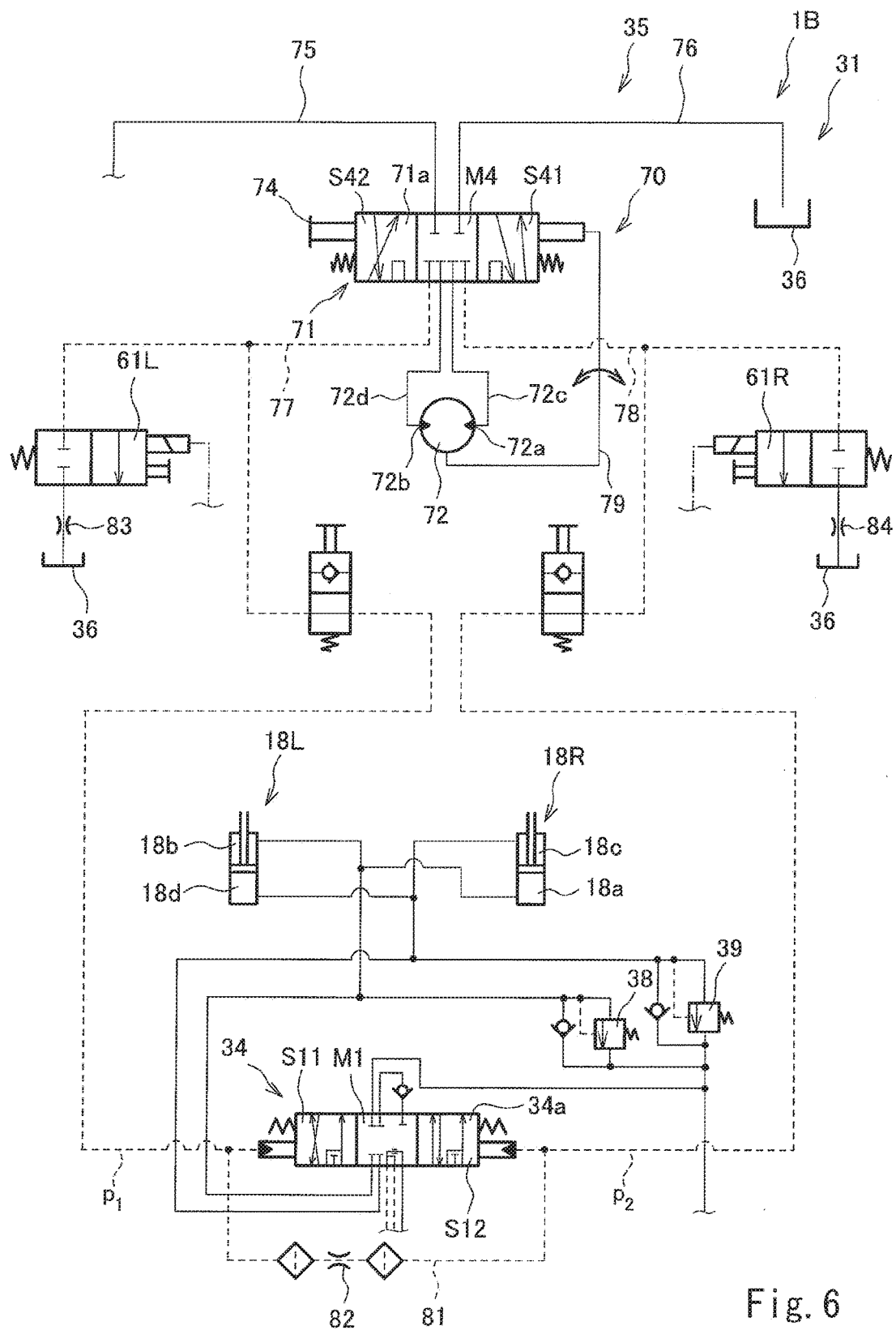
FIG. 6 is a circuit diagram showing in an enlarged manner, a portion of a hydraulic circuit of a hydraulic drive system according to Embodiment 3 of the present invention, the portion being in the vicinity of a steering device.

As shown in FIG. 5, the hydraulic drive system 1A of Embodiment 2 includes a flow rate control (adjustment) means 60A. The flow rate control means 60A includes an outlet pressure switching valve 1A and the controller 62. The outlet pressure switching valve 61A is an electromagnetic switching valve, and is connected to the bypass passage 48 and the tank 36. The outlet pressure switching valve 61A is configured to connect the pilot passage 63 and the tank 36 to each other or disconnect the pilot passage 63 and the tank 36 from each other, in response to a command signal (flow rate limiting command) from the controller 62.

In a state in which the operation button 51 is not operated, the outlet pressure switching valve 61A configured as described above is connected to the pilot passage 63 via the bypass passage 48. The outlet pressure switching valve 61A connects the pilot passage 63 and the tank 36 to each other, in response to the command signal. In a state in which the pilot passage 63 and the tank 36 are connected to each other, the pilot oil flowing through the bypass passage 48 is discharged to the tank 36 via the outlet pressure switching valve 61A. This makes it possible to reduce the pilot pressure $P_4$ input to the bleed-off compensator 42 and makes it difficult to close the bleed-off compensator 42. In addition, since the pilot pressure $P_4$ input to the bleed-off compensator 42 is reduced, it becomes difficult to open the meter-in compensator 37. Thus, since it becomes difficult to open the meter-in compensator 37 and difficult to close the bleed-off compensator 42, the flow rate of the hydraulic oil flowing to the steering control valve 34 is reduced, and the flow rate of the hydraulic oil flowing to the steering cylinders 18L, 18R is reduced. In this way, the flow rate of the hydraulic oil flowing to the steering cylinders 18L, 18R can be reduced without substantially affecting a feeling of the handle operation of the steering device 35.

The hydraulic drive system 1A operates as in the hydraulic drive system 1 of Embodiment 1, and obtains the same advantages as those of the hydraulic drive system 1 of Embodiment 1.

Embodiment 3

The steering device 35 of a hydraulic drive system 1B of Embodiment 3 is configured as in the steering device 35 of the hydraulic drive systems of Embodiment 1 and Embodiment 2, and includes a power steeling unit 70. The power steering unit 70 includes a direction switching valve 71 and a metering mechanism 72. The direction control valve 71 includes a spool 71a. A handle 74 is coupled to the spool 71a. The handle 74 is configured to be rotated. When the handle 74 is rotated, the spool 71a is moved. The direction control valve 71 is connected to a portion of the meter-in passage 33 which is upstream of the meter-in compensator 37, via a supply passage 75, and connected to the tank 36 via a tank passage 76. Further, the direction control valve 71 is connected to the main spool 34a of the steering control valve 34 via a first pilot passage 77 and a second pilot passage 78. The direction control valve 71 is also connected to the metering mechanism 72.

The metering mechanism 72 is a pump, and includes two suction/discharge ports 72a, 72b. The metering mechanism 72 is coupled to the handle 74 via a shaft 79. According to the rotational operation of the handle 74, the pressurized hydraulic oil is suctioned through the suction/discharge port 72a (or the suction/discharge port 72b), and the pilot oil is discharged through the suction/discharge port 72b (or the suction/discharge port 72a). The two suction/discharge ports 72a, 72b are connected to the direction control valve 71 via suction/discharge passages 72c, 72d, respectively.

The direction control valve 71 to which a plurality of passages are connected is configured to move the spool 71a according to the rotational operation of the handle 74, and switch the flow of the pilot oil according to the position of the spool 71a. Specifically, when the handle 74 is rotated, the spool 71a is moved from a neutral position M4 to a first offset position S41 or a second offset position S42 according to the rotational direction of the handle 74. When the spool 71a is moved to the first offset position S41, the supply passage 75 is connected to the suction/discharge passage 72c, and the suction/discharge passage 72d is connected to the first pilot passage 77. Thereby, the first pilot oil is guided to the first pilot passage 77 at a flow rate corresponding to the operation amount of the handle 74. The second pilot passage 78 is connected to the tank passage 76 according to the movement of the spool 71a to the first offset position S41.

The first pilot passage 77 and the second pilot passage 78 are in communication with each other via a communication passage 81. In a state in which the second pilot passage 78 is connected to the tank, the first pilot oil flowing through the first pilot passage 77 flows to the second pilot passage 78 through the communication passage 81. A throttle 82 is provided in the communication passage 81. The first pilot oil flows through the throttle 82, and thereby a first pilot pressure $p_1$ corresponding to the flow rate of the first pilot oil flowing through the first pilot passage 77 is generated in the first pilot passage 77. The first pilot pressure $p_1$ is applied to the main spool 34a. This makes it possible to move the main spool 34a to a position corresponding to the operation amount of the handle 74, namely, the first offset position S41.

On the other hand, when the spool 71a is moved to the second offset position S42, the supply passage 75 is connected to the suction/discharge passage 72d and the suction/discharge passage 72c is connected to the second pilot passage 78. Thereby, the second pilot oil is guided to the second pilot passage 78 at a flow rate corresponding to the operation amount of the handle 74. The first pilot passage 77 is connected to the tank passage 76 according to the movement of the spool 71a to the second offset position S42. The second pilot oil flows from the second pilot passage 78 to the first pilot passage 77 via the communication passage 81. At this time, since the second pilot oil flows through the throttle 82, a second pilot pressure $p_2$ corresponding to the flow rate of the second pilot oil flowing through the second pilot passage 78 is generated in the second pilot passage 78. The second pilot pressure $p_2$ is applied to the main spool 34a. This makes it possible to move the main spool 34a to a position corresponding to the operation amount of the handle 74, namely, the second offset position S12. The steering device 35 configured as described above is provided with a flow rate control (adjustment) means 60B.

The flow rate control means 60B is configured to adjust the flow rate of the first pilot oil flowing through the first pilot passage 77 and the flow rate of the second pilot oil flowing through the second pilot passage 78, to control the position of the main spool 34a to thereby reduce the flow rate of the hydraulic oil flowing to the steering cylinders 18L, 18R in such a manner that the flow rate becomes lower than that corresponding to the operation amount of the handle of the steering device 35. The configuration of flow rate control means 60B will be specifically described. The flow rate control means 60B includes two opening/closing switching valves 61L, 61R, and a controller 62B. The opening/closing switching valve 61L is connected to the first pilot passage 77, while the opening/closing switching valve 61R is connected to the second pilot passage 78. The two opening/closing switching valves 611, 61R are electromagnetic switching valves. The two opening/closing switching valves 61L, 61R are configured to connect the pilot passage 77, 78 and the tank 36 to each other or disconnect the pilot passage 77, 78 and the tank 36 from each other, in response to a command signal (flow rate limiting command) input to the two opening/closing switching valves 61L, 61L. A throttle 83 is provided between the opening/closing switching valve 61L and the tank 36, while a throttle 84 is provided between the opening/closing switching valve 61R and the tank 36. A portion of the pilot oil flowing through the first pilot passage 77 and a portion of the pilot oil flowing through the second pilot passage 78 are discharged to the tank 36 via the throttles 83, 84, respectively. The two opening/closing switching valves 61L, 61R configured as described above are electrically connected to the controller 62B, and configured to receive as an input the command signal from the controller 62B.

Figure 7:
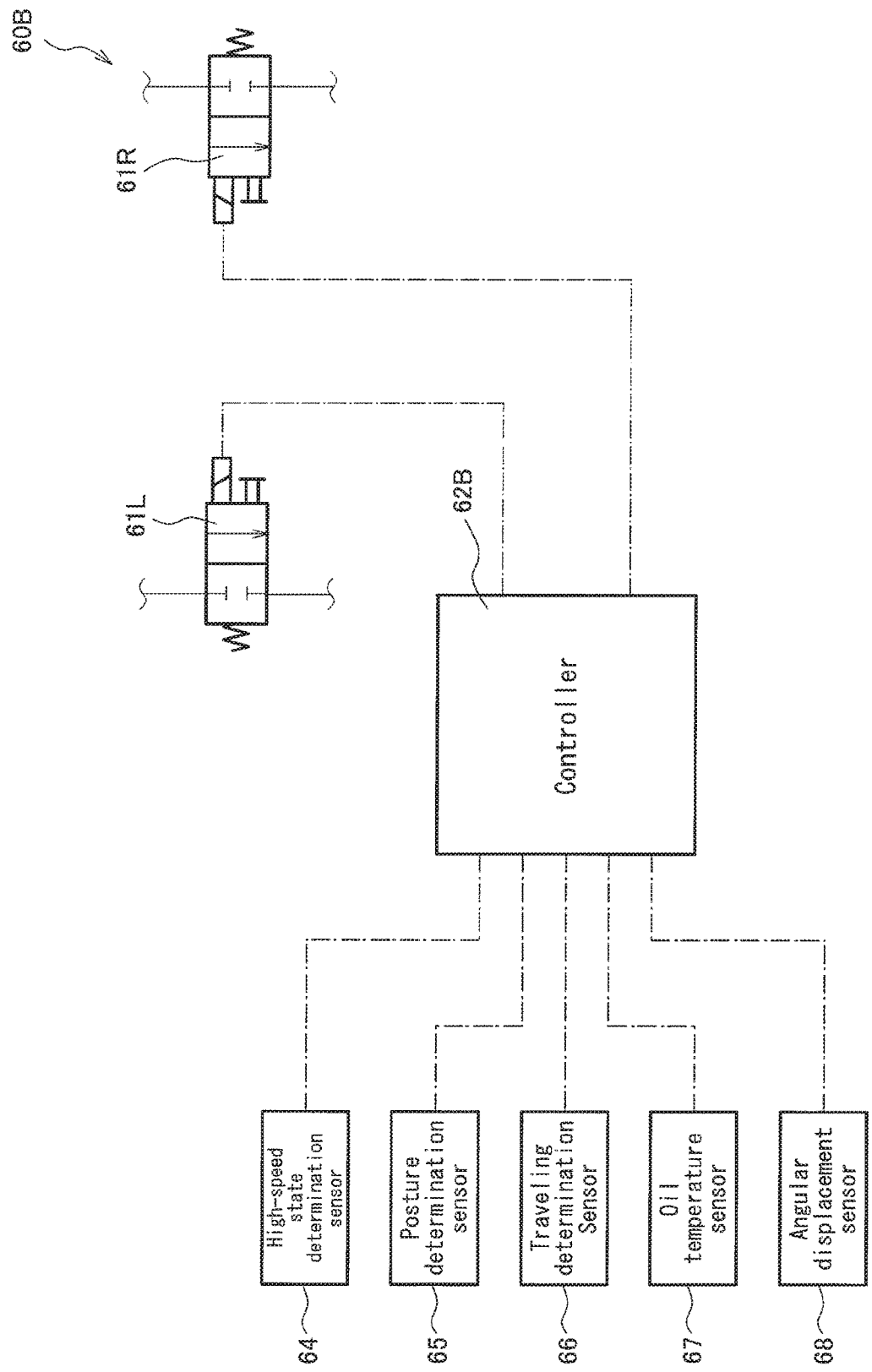
FIG. 7 is a diagram showing the electric configuration of the hydraulic drive system of FIG. 6.

As shown in FIG. 7, as in the controller 62 of Embodiment 1, the controller 62B is electrically connected to the sensors 64 to 68, and configured to determine whether or not the state of the wheel loader 2 meets the steering limiting condition, and whether or not the state of the wheel loader 2 meets the steering limiting inhibiting condition based on the signals output from the sensors. Thus, the controller 62B is configured to output the command signal to the opening/closing switching valves 61L, 61R. The controller 62B reduces the flow rate of the pilot oil to reduce the flow rate of the hydraulic oil flowing to the steering cylinders 18L, 18R in such a manner that the flow rate becomes lower than that corresponding to the operation amount of the handle of the steering device 35. In this way, the responsivity of the steering cylinders 18L, 18R to the operation of the handle 74 can be lowered, and as a result, the wheel loader 2 can travel straight during high-speed traveling.

The hydraulic drive system 1B of Embodiment 3 operates as in the hydraulic drive system 1 of Embodiment 1, and obtains the same advantages as those of the hydraulic drive system) of Embodiment 1.

Embodiment 4

Figure 8:
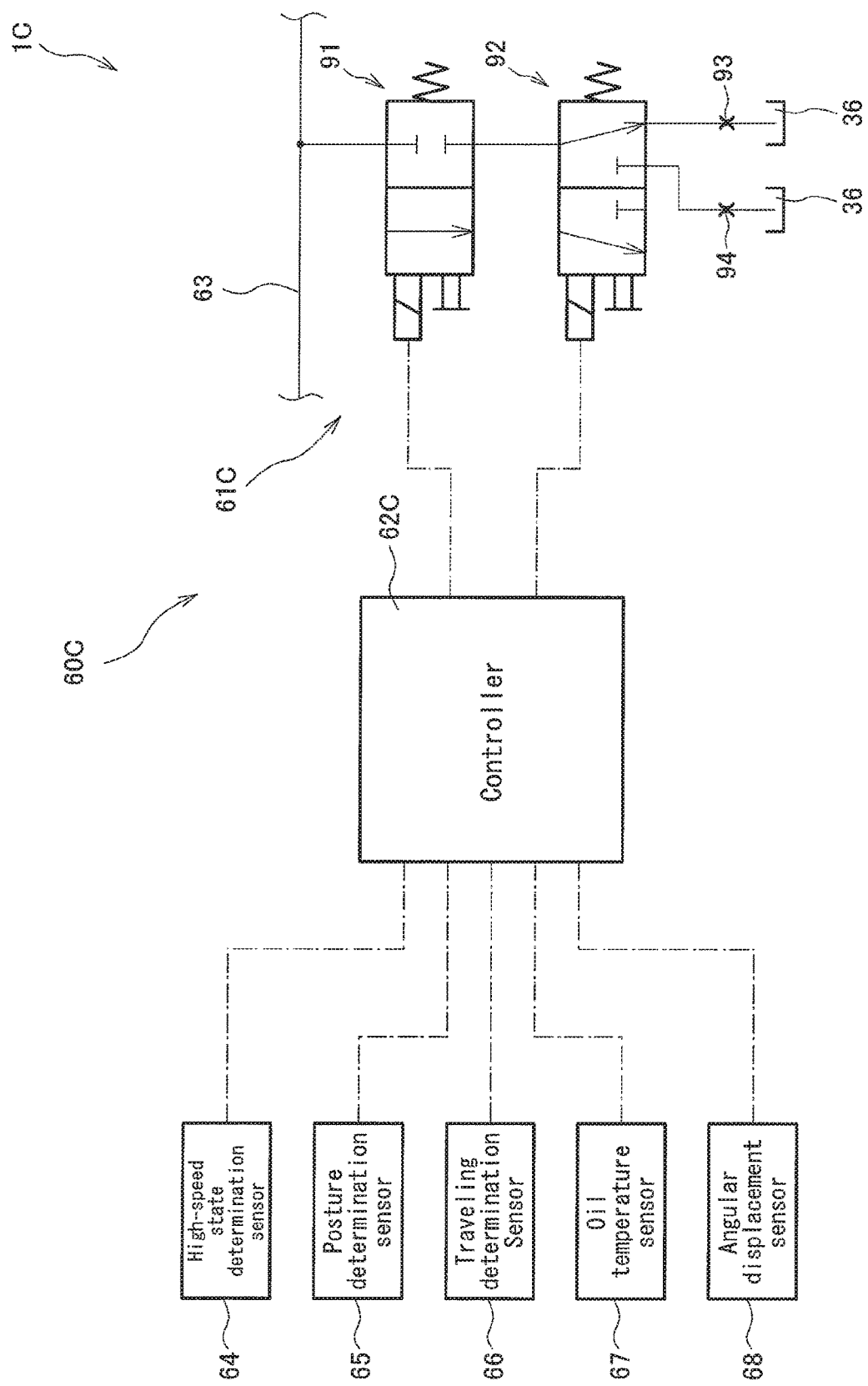
FIG. 8 is a diagram showing the electric configuration of a hydraulic drive system according to Embodiment 4 of the present invention.

As shown in FIG. 8, a hydraulic drive system 1C of Embodiment 4 includes a flow rate control (adjustment) device 60C. The flow rate control device 60C includes a flow rate control mechanism 61C and a controller 62C. The flow rate control mechanism 61C is connected to the pilot passage 63 and the tank 36. The flow rate control mechanism 61C is configured to connect the pilot passage 63 and the tank 36 to each other in response to a command signal input to the flow rate control mechanism 61C and switch (change) the flow rate of the pilot oil discharged from the pilot passage 63 to the tank 36 in response to a flow rate switching signal input to the flow rate control mechanism 61C.

More specifically, the flow rate control mechanism 61C includes an electromagnetic switching valve 91, a direction switching valve 92, a first throttle 93 and a second throttle 94. The electromagnetic switching valve 91 is connected to the pilot passage 63 and the direction switching valve 92. The electromagnetic switching valve 91 is configured to connect the pilot passage 63 and the direction switching valve 92 to each other or disconnect the pilot passage 63 and the direction switching valve 92 from each other, in response to a command signal input to the electromagnetic switching valve 91. The direction switching valve 92 is connected to the electromagnetic switching valve 91, the first throttle 93, and the second throttle 94. The direction switching valve 92 is configured to connect the electromagnetic switching valve 91 to either one of the first throttle 93 and the second throttle 94, in response to the flow rate switching signal input to the direction switching valve 92. The first throttle 93 and the second throttle 94 are connected to the tank 36. The first throttle 93 and the second throttle 94 have passage cross-sections which are different from each other. The passage cross-section of the first throttle 93 is set to be smaller than that of the second throttle 94. The electromagnetic switching valve 91 and the direction switching valve 92 are electrically connected to the controller 62C.

The controller 62C is electrically connected to the high-speed state determination sensor 64, the posture determination sensor 65, and the traveling determination sensor 66. The controller 62C is also electrically connected to the oil temperature sensor 67 and the angular displacement sensor 68. The controller 62C is configured to determine whether or not the state of the wheel loader 2 meets the steering limiting condition based on the signals from the sensors 64 to 66, and determines whether or not the state of the wheel loader 2 meets the steering limiting inhibiting condition based on the signals from the sensors 67, 68. The controller 62C is configured to output the command signal to the electromagnetic switching valve 91 depending on whether or not the state of the wheel loader 2 meets the steering limiting condition, and whether or not the state of the wheel loader 2 meets the steering limiting inhibiting condition.

The controller 62C is configured to determine whether or not the state of the wheel loader 2 meets a flow rate switching condition based on the signal output from the high-speed state determination sensor 64. The flow rate switching condition includes a condition in which the vehicle speed V of the wheel loader 2 is equal to or higher than V1 (e.g., 30 km/h). Further, the flow rate switching condition may include a condition in which the oil temperature T is equal to or higher than T2 (>T1), and a condition in which the handle rotational speed N1 is equal to or lower than N2 (<N1). The flow rate switching condition may be a condition in which the state of the wheel loader 2 meets at least one of the three conditions (namely, the conditions relating to the vehicle speed, the oil temperature, and the handle rotational speed). When the controller 62C determines that the state of the wheel loader 2 meets the flow rate switching condition, the controller 62B outputs a flow rate switching signal to the direction switching valve 92.

<High-Speed Steering Control>

Figure 9:
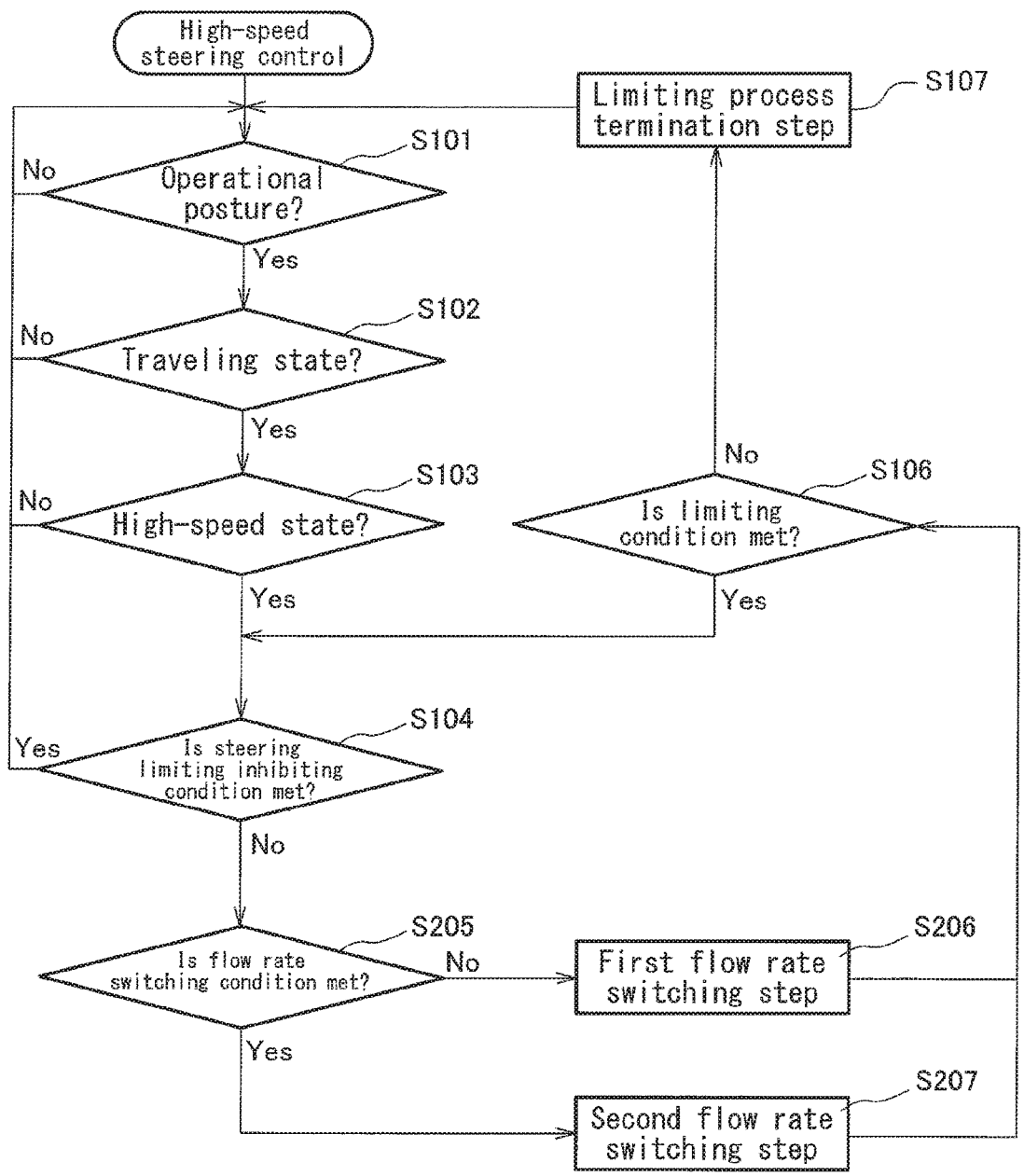
FIG. 9 is a flowchart showing a procedure for a high-speed steering control executed by the hydraulic drive system of FIG. 8.

In the hydraulic drive system 1C configured as described above, when the power supply of the wheel loader 2 is turned on, the high-speed steering control of FIG. 9 is initiated, and the process shifts to the step S101. As in the hydraulic drive system 1 of Embodiment 1, the controller 62C determines whether or not the state of the wheel loader 2 meets the steering limiting condition in the steps S101 to S103. When the controller 62C determines that the state of the wheel loader 2 meets the steering limiting condition in the steps S101 to S103, the process shifts to the step S104. In the step S104, the controller 62C determines whether or not the state of the wheel loader 2 meets the steering limiting inhibiting condition. When the controller 62C determines that the state of the wheel loader 2 meets the steering limiting inhibiting condition, the process returns to the step S101. On the other hand, when the controller 62C determines that the state of the wheel loader 2 does not meet the steering limiting inhibiting condition, the process shifts to step S205. In the step S205 which is a flow rate switching condition determination step, the controller 62C determines whether or not the state of the wheel loader 2 meets the flow rate switching condition, to switch (change) the flow rate of the pilot oil flowing to the tank 36 depending on whether or not the state of the wheel loader 2 meets the flow rate switching condition. When the controller 62C determines that the state of the wheel loader 2 does not meet the flow rate switching condition, the process shifts to step S206. On the other hand, when the controller 62C determines that the state of the wheel loader 2 meets the flow rate switching condition, the process shifts to step S207.

In the step S206 which is a first flow rate switching step, the controller 62C outputs a command signal to the electromagnetic switching valve 91 to connect the pilot passage 63 and the direction switching valve 92 to each other. Thereby, a portion of the pilot oil flowing through the pilot passage 63 is released to the tank 36 via the direction switching valve 92 and the first throttle 93. Thus, the responsivity of the steering cylinders 18L, 18R to the operation of the handle is lowered, and a result, the wheel loader 2 can travel straight during high-speed traveling. After the flow rate of the pilot oil in the meter-in passage 33 is limited in this way, the process shifts to the step S106. Since the step S106 and the step S107 of Embodiment 3 are the same as the step S106 and the step S107 of the high-speed steering control executed by the hydraulic drive system 1 of Embodiment 1, the step S106 and the step S107 of Embodiment 3 will not be described repeatedly. The same applies to the following embodiments.

In the step S207 which is a second flow rate switching step, the controller 62C outputs a command signal to the electromagnetic switching valve 91 to connect the pilot passage 63 and the direction switching valve 92 to each other. In addition, the controller 62C outputs a flow rate switching signal to the direction switching valve 92 to connect the electromagnetic switching valve 91 to the second throttle 94. Thereby, a portion of the pilot oil flowing through the pilot passage 63 is released to the tank 36 via the direction switching valve 92 and the second throttle 94. Since the passage cross-section of the second throttle 94 is greater than that of the first throttle 93, the pilot oil is discharged from the pilot passage 63 to the tank 36 via the second throttle 94 at a flow rate higher than that of the pilot oil discharged from the pilot passage 63 to the tank 36 via the first throttle 93, and hence the outlet pressure $p_4$ of the steering control valve 34 becomes lower than that in the first flow rate switching step. Thereby, a differential pressure $p_3$ between the inlet pressure and the outlet pressure $p_4$ of the steering control valve 34 is further increased, and the controller 62C can reduce the flow rate of the hydraulic oil flowing to the steering cylinders 18L, 18R in such a manner that the flow rate becomes much lower than that corresponding to the operation amount of the handle of the steering device 35. In this way, the responsivity of the steering cylinders 18L, 18R to the operation of the handle is further lowered, and as a result, the wheel loader 2 can travel straight during high-speed traveling. After the flow rate of the pilot oil in the meter-in passage 33 is switched (changed), the process shifts to the step S106.

In the hydraulic drive system 1C configured as described above, the controller 62C adjusts the responsivity of the steering cylinders 18L, 18R to the handle operation, depending on whether or not the state of the wheel loader 2 meets the flow rate switching condition. Therefore, in a case where the speed of the wheel loader 2 is relatively low during the high-speed traveling, it becomes possible to prevent a situation in which the responsivity of the steering cylinders 18L, 18R is lowered excessively and the steering performance is reduced excessively. Since the reduction amount of the flow rate of the hydraulic oil guided to the steering cylinders 18L, 18R with respect to the operation amount of the steering device is suppressed with a decrease in the oil temperature T, it becomes possible to prevent a situation in which the responsivity of the steering cylinders 18L, 18R is lowered excessively. Further, since the reduction amount of the flow rate of the hydraulic oil guided to the steering cylinders 18L, 18R with respect to the operation amount of the steering device is suppressed with an increase in the handle rotational speed N, the driver's intention that the traveling direction of the wheel loader 2 is switched quickly can be realized.

The hydraulic drive system 1C operates as in the hydraulic drive system 1 of Embodiment 1, and obtains the same advantages as those of the hydraulic drive system 1 of Embodiment 1.

Embodiment 5

Figure 10:
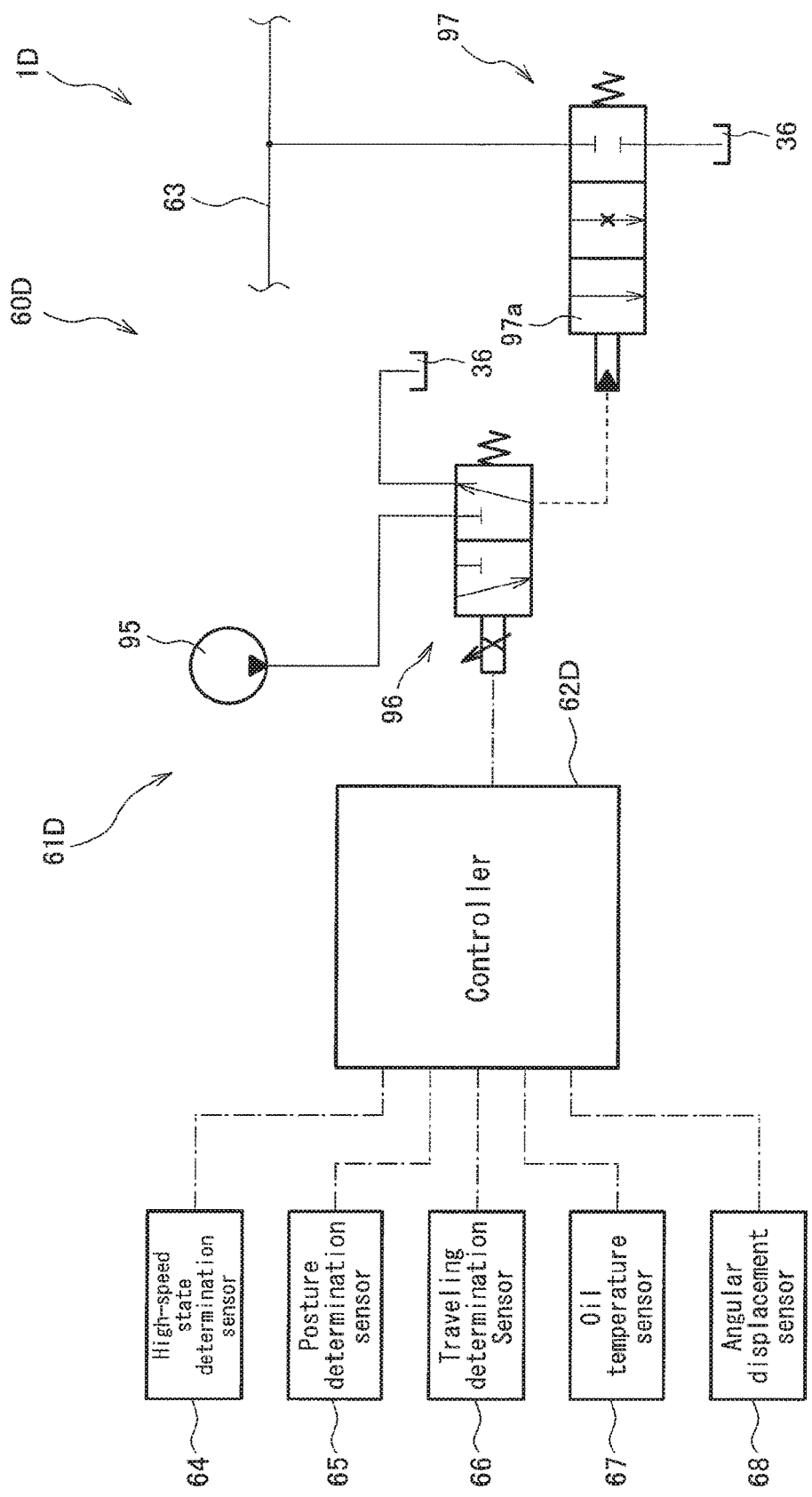
FIG. 10 is a diagram showing the electric configuration of a hydraulic drive system according to Embodiment 5 of the present invention.

As shown in FIG. 10, a hydraulic drive system 1D of Embodiment 5 includes a flow rate control (adjustment) device 60D. The flow rate control device 60D includes a flow rate control mechanism 61D and a controller 62D. The flow rate control mechanism 61D is connected to the pilot passage 63 and the tank 36. The flow rate control mechanism 61D is configured to switch (change) the flow rate of the pilot oil discharged from the pilot passage 63 to the tank 36, in response to a flow rate switching signal input to the flow rate control mechanism 61D.

More specifically, the flow rate control mechanism 61D includes a pilot pump 95, an electromagnetic proportional valve 96, and a flow rate control valve 97. The pilot pump 95 is configured to discharge pressurized oil. The discharged pressurized oil is guided to the electromagnetic proportional valve 96. The electromagnetic proportional valve 96 is connected to the pilot pump 95 and the flow rate control valve 97. The electromagnetic proportional valve 96 is configured to receive a flow rate switching signal (flow rate limiting signal) as an input, and to open a passage between the pilot pump 95 and the flow rate control valve 97, with an opening degree corresponding to the flow rate switching signal. Thereby, a flow rate switching pilot pressure corresponding to the flow rate switching signal is guided to the flow rate control valve 97. The flow rate control valve 97 is connected to the pilot passage 63 and the tank 36. A spool 97a of the flow rate control valve 97 is moved according to the flow rate switching pilot pressure guided from the electromagnetic proportional valve 96 to the flow rate control valve 97. Since the spool 97a of the flow rate control valve 97 is moved, a passage between the pilot passage 63 and the tank 36 is opened with an opening degree corresponding to the flow rate switching pilot pressure. Specifically, the flow rate control valve 97 is configured to discharge pilot oil from the pilot passage 63 to the tank 36 at a flow rate corresponding to the flow rate switching signal. The controller 62D is electrically connected to the electromagnetic proportional valve 96 of the flow rate control mechanism 61D configured as described above.

The controller 62D is electrically connected to the high-speed state determination sensor 64, the posture determination sensor 65, and the traveling determination sensor 66. The controller 62D is also electrically connected to the oil temperature sensor 67 and the angular displacement sensor 68. The controller 62D is configured to determine whether or not the state of the wheel loader 2 meets the steering limiting condition based on the signals from the sensors 64 to 66, and determine whether or not the state of the wheel loader 2 meets the steering limiting inhibiting condition based on the signals from the sensors 67, 68. Further, the controller 62D is configured to output a flow rate switching signal (flow rate limiting signal) to the electromagnetic proportional valve 96, depending on whether or not the state of the wheel loader 2 meets the steering limiting condition and whether or not the state of the wheel loader 2 meets the steering limiting inhibiting condition.

The controller 62D determines whether or not the state of the wheel loader 2 meets a first flow rate switching condition and a second flow rate switching condition based on the signal output from the high-speed state determination sensor 64. The first flow rate switching condition is a condition in which the oil temperature T is equal to or lower than T2 (>T1), a condition in which the handle rotational speed N is equal to or higher than N2 (<N1), or a condition in which the vehicle speed V is equal to or lower than V2 (>V1) (e.g., T2=40 degrees C., N2=45 rpm, V2=25 km/h). The second flow rate switching condition is a condition in which the oil temperature T is equal to or lower than T3 (>T2>T1), a condition in which the handle rotational speed N is equal to or higher than N3 (<N2<N1), or a condition in which the vehicle speed V is equal to or lower than V3 (>V2>V1) (e.g., T3=60 degrees C., N3=30 rpm, V3=30 km/h). The first flow rate switching condition and the second flow rate switching condition may be a condition in which the state of the wheel loader 2 meets at least one of the three conditions (namely, the conditions relating to the vehicle speed, the oil temperature, and the handle rotational speed).

The controller 62D is configured to change the value (e.g., current value) of the flow rate switching signal output from the controller 62D, depending on whether or not the state of the wheel loader 2 meets the first flow rate switching condition or the second flow rate switching condition, or the content of the condition. According to the change in the value of the flow rate switching signal output from the controller 62D, the opening degree of the electromagnetic proportional valve 96 is changed. Thereby, the flow rate control valve 97 adjusts the opening degree of the passage between the pilot passage 63 and the tank 36 based on the condition which is met, to discharge the pilot oil from the pilot passage 63 to the tank 36, at a flow rate corresponding to the above-described condition which is met. In the present embodiment, the opening degree of the passage between the pilot passage 63 and the tank 36 is greater when the state of the wheel loader 2 meets the first flow rate switching condition than when the state of the wheel loader 2 meets the second flow rate switching condition. Also, the opening degree of the passage between the pilot passage 63 and the tank 36 is smaller when the state of the wheel loader 2 does not meet the first and second flow rate switching conditions than when the state of the wheel loader 2 meets the second flow rate switching condition.

<High-Speed Steering Control>

Figure 11:
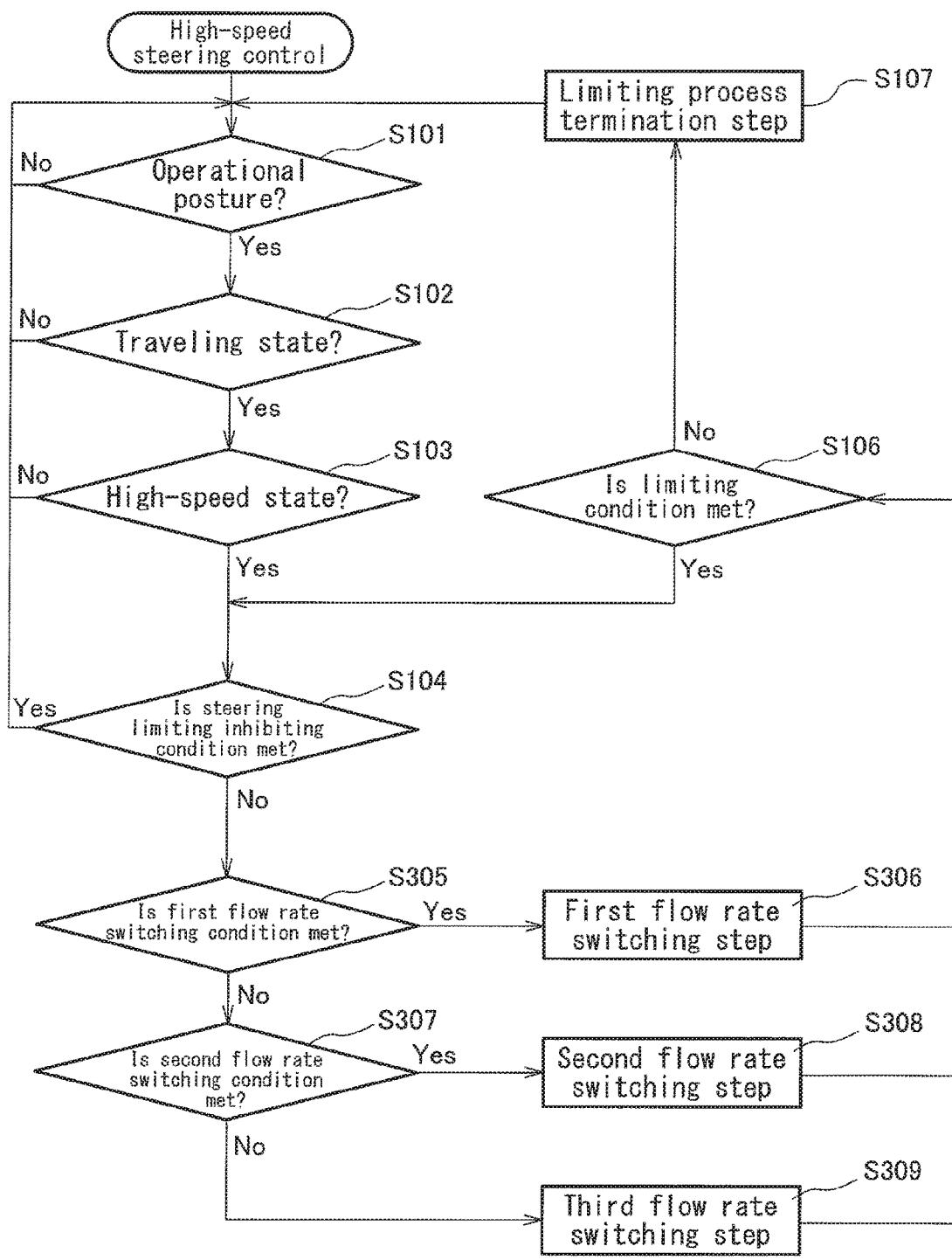
FIG. 11 is a flowchart showing a procedure for a high-speed steering control executed by the hydraulic drive system of FIG. 10.

In the hydraulic drive system 1D configured as described above, when a power supply of the wheel loader 2 is turned on, the high-speed steering control of FIG. 11 is initiated, and the process shifts to the step S101. As in the hydraulic drive system 1 of Embodiment 1, the controller 62D determines whether or not the state of the wheel loader 2 meets the steering limiting condition in the steps S101 to S103. When the controller 62D determines that the state of the wheel loader 2 meets the steering limiting condition in the steps S101 to S103, the process shifts to the step S104. In the step S104, the controller 62D determines whether or not the state of the wheel loader 2 meets the steering limiting inhibiting condition. When the controller 62D determines that the state of the wheel loader 2 meets the steering limiting inhibiting condition, the process returns to the step S101. On the other hand, when the controller 62D determines that the state of the wheel loader 2 does not meet the steering limiting inhibiting condition, the process shifts to step S305.

In the step S305 which is a first flow rate switching condition determination step, the controller 62D determines whether or not the state of the wheel loader 2 meets the first flow rate switching condition. When the controller 62D determines that the state of the wheel loader 2 meets the first flow rate switching condition, the process shifts to step S306. On the other hand, when the controller 62D determines that the state of the wheel loader 2 does not meet the first flow rate switching condition, the process shifts to step S307.

In the step S306 which is a first opening degree adjustment step, the controller 62D outputs the flow rate switching signal to the electromagnetic proportional valve 96, to output a flow rate switching pilot pressure from the electromagnetic proportional valve 96, thereby actuating the flow rate control valve 97. Thereby, the pilot passage 63 and the tank 36 are connected to each other with an opening degree corresponding to the first flow rate switching condition (namely, the flow rate switching pilot pressure), and a portion of the pilot oil flowing through the pilot passage 63 is released to the tank 36 via the flow rate control valve 97. In this way, the responsivity of the steering cylinders 18L, 18R to the operation of the handle is lowered, and as a result, the wheel loader 2 can travel straight during high-speed traveling. After the flow rate of the pilot oil in the meter-in passage 33 is limited in this way, the process shifts to the step S106.

In the step S307 which is a second flow rate switching condition determination step, the controller 62D determines whether or not the state of the wheel loader 2 meets the second flow rate switching condition. When the controller 62D determines that the state of the wheel loader 2 meets the second flow rate switching condition, the process shifts to step S308. On the other hand, when the controller 62D determines that the state of the wheel loader 2 does not meet the second flow rate switching condition, the process shifts to step S309.

In the step S308 which is a second flow rate switching step, the controller 62D outputs the flow rate switching signal to the electromagnetic proportional valve 96, to output a flow rate switching pilot pressure from the electromagnetic proportional valve 96, thereby actuating the flow rate control valve 97. Thereby, the pilot passage 63 and the tank 36 are connected to each other with an opening degree corresponding to the second flow rate switching condition (namely, the flow rate switching pilot pressure), and a portion of the pilot oil flowing through the pilot passage 63 is released to the tank 36 via the flow rate control valve 97. In this way, by use of the second flow rate switching condition different from the first flow rate switching condition, the responsivity of the steering cylinders 18L, 18R to the operation of the handle can be adjusted more finely based on the oil temperature, the engine speed, and the traveling speed. After the flow rate of the pilot oil in the meter-in passage 33 is switched (changed), the process shifts to the step S106.

In the step S309 which is a third flow rate switching step, the controller 62D outputs the flow rate switching signal to the electromagnetic proportional valve 96, to output the flow rate switching pilot pressure from the electromagnetic proportional valve 96, thereby actuating the flow rate control valve 97. Thereby, the pilot passage 63 and the tank 36 are connected to each other with an opening degree corresponding to the flow rate switching pilot pressure, and a portion of the pilot oil flowing through the pilot passage 63 is released to the tank 36 via the flow rate control valve 97. In this way, by use of the third flow rate switching condition different from the first and second flow rate switching conditions, the responsivity of the steering cylinders 18L, 18R to the operation of the handle can be adjusted more finely based on the oil temperature, the engine speed, and the traveling speed. After the flow rate of the pilot oil in the meter-in passage 33 is switched (changed) in this way, the process shifts to the step S106.

In the hydraulic drive system 1D configured as described above, the flow rate control valve 97 is configured to adjust the opening degree of the passage between the pilot passage 63 and the tank 36, depending on the flow rate switching condition which is met. This makes it possible to adjust the amount of the plat oil discharged from the pilot passage 63 to the tank 36 via the flow rate control valve 97, depending on the flow rate switching condition which is met. In this way, the flow rate of the hydraulic oil flowing to the steering cylinders 18L, 18R can be adjusted at multiple levels, depending on the flow rate switching condition which is met. As a result, it becomes possible to prevent a situation in which the responsivity of the steering cylinders 18L, 18R is lowered excessively.

The hydraulic drive system 1D operates as in the hydraulic drive system 1 of Embodiment 1, and obtains the same advantages as those of the hydraulic drive system 1 of Embodiment 1.

Other Embodiments

In the hydraulic drive system 1, 1A, 1B, 1C, 1D of Embodiment 1 to Embodiment 5, when the controller 62, 62B, 62C, 62D determines that the state of the wheel loader 2 meets the steering limiting condition and is traveling at a high speed, the controller 62, 62B, 62C, 62D executes the steering limiting process. However, the case where the controller 62, 62B, 62C, 62D executes the steering limiting process is not limited to the case where the controller 62, 62B, 62C, 62D determines that the state of the wheel loader 2 is traveling at a high speed. For example, in a case where a condition relating to the oil temperature T is included in the steering limiting condition, and the controller 62, 62B, 62C, 62D determines that the oil temperature T is equal to or higher than a threshold, or a case where a condition relating to the handle rotational speed N is included in the steering limiting condition, and the controller 62, 62B, 62C, 62D determines that the handle rotational speed N is equal to or lower than a threshold, the controller 62, 62B, 62C, 62D may execute the steering limiting process. In other words, when the controller 62, 62B, 62C, 62D determines that the state of the wheel loader 2 meets the steering limiting condition of a predetermined content, the controller 62, 62B, 62C, 62D may execute the steering limiting process. Further, in the high-speed steering control, the steering limiting inhibiting condition determination step is not necessarily required and may be omitted.

In the hydraulic drive system 1 of Embodiment 1, the controller 62 connects the pilot passage 63 and the tank 36 to each other via the outlet pressure switching valve 61, depending on whether or not the state of the wheel loader 2 meets the steering limiting condition. However, when the driver operates an operation section which is not shown irrespective of whether or not the state of the wheel loader 2 meets the steering limiting condition, the controller 62 may output a command signal to the outlet pressure switching valve 61, to connect the pilot passage 63 and the tank 36 to each other. This makes it possible change the responsivity of the steering actuator according to the driver's intention. Further, when the driver operates the operation section which is not shown irrespective of whether or not the state of the wheel loader 2 meets the steering limiting condition, the controller 62 may not perform the high-speed steering process. The same applies to the hydraulic drive systems 1A, 1C, 1D of Embodiments 2, 4, 5. When the driver operates the operation section which is not shown irrespective of whether or not the state of the wheel loader 2 meets the steering limiting condition, the controller 62, 62C, 62D may output a command signal. Further, in the hydraulic drive system 19 of Embodiment 3, the controller 62B may control the opening/closing switching valve 61L, 61R in response to the driver's operation of the operation section so that the driver can change the responsivity of the steering actuator as desired, or the controller 62, 62B may not perform the high-speed steering process, irrespective of whether or not the state of the wheel loader 2 meets the steering limiting condition.

Although the outlet pressure switching valve 61, 61A is used as the flow rate control mechanism, the flow rate control mechanism is not limited to such a control valve. For example, the biasing force of the spring 37a, 42b which biases the spool 37a of the meter-in compensator 37 or the spool 42a of the bleed-off compensator 42, respectively, may be varied, in response to the flow rate limiting command. In this case, a piston may be actuated in response to the flow rate limiting command to vary the compression amount or extension amount of the spring 37a, 42b.

Although in the hydraulic drive system 1C of Embodiment 4 and the hydraulic drive system 1D of Embodiment 5, the flow rate control device 60C, 60D is connected to the pilot passage 63, a passage to which the flow rate control device 60C, 60D is connected is not limited to the pilot passage 63. The flow rate control device 60C, 60D may be connected to the bypass passage 48, the first pilot passage 77 or the second pilot passage 78.

Although in the hydraulic drive system 1D of Embodiment 5, the flow rate of the pilot oil discharged from the pilot passage 63 to the tank 36 is adjustable at three levels, the levels at which the flow rate is adjustable is not limited to the three levels, and may be adjustable at four or more levels according to the condition. Further, switching conditions (thresholds) corresponding to the vehicle speed, the oil temperature, and the handle rotational speed may be set, and the controller 62D may determine which of the switching conditions each of the parameters which are the vehicle speed, the oil temperature, and the handle rotational speed meets. In this case, the value of the flow rate switching signal output according to the condition which is to be met by each of the parameters, is varied to adjust the opening degree of the passage between the pilot passage 63 and the tank 36. For example, in a case where the first flow rate switching condition and the second flow rate switching condition relating to each of the parameters are set, there are 27 combinations of whether or not each of the parameters meets the flow rate switching condition, including a case where each of the parameters does not meet the two flow rate switching conditions. According to each combination, the opening degree of the passage between the pilot passage 63 and the tank 36 is adjusted. By performing such a matrix control, the responsivity of the steering cylinders 18L, 18R to the operation of the handle can be adjusted more finely, based on the oil temperature, the engine speed, and the traveling speed.

Although in the present embodiment, the hydraulic drive system 1, 1A, 1B is incorporated into the wheel loader 2, a vehicle into which the hydraulic drive system 1, 1A, 1B is incorporated is not limited to the wheel loader 2, and may be a hydraulic shovel, a bulldozer, etc. so long as the vehicle is a vehicle (e.g., construction vehicle) including the steering actuator and the work machine actuator.

Numerous improvements and alternative embodiment of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the scope of the invention.

REFERENCE SIGNS LIST 1, 1A, 1B hydraulic drive system
2 wheel loader
11 bucket
18L, 18R steering cylinder
22 boom cylinder
23 tilt cylinder
30 hydraulic pump
33 meter-in passage
34 steering control valve
34a steering spool
37 meter-in compensator
41 bleed-off passage
42 bleed-off compensator
43 tilt control valve
44 boom control valve
61, 61A outlet pressure switching valve
61L, 61R opening/closing switching valve
61C, 61D flow rate control mechanism
62, 62B, 62C, 62D controller
64 high-speed state determination sensor
65 posture determination sensor
66 traveling determination sensor
67 oil temperature sensor
68 angular displacement sensor

The invention claimed is:

1. A hydraulic drive system comprising:
a hydraulic pump to which a steering actuator for switching a traveling direction of a vehicle and a work machine actuator for moving a work machine are connected in parallel;
a steering device for operating the steering actuator;
a steering control valve which includes a spool which is movable according to an operation of the steering device and is configured to move the spool to adjust an opening degree of the spool to flow hydraulic oil from the hydraulic pump to the steering actuator at a flow rate corresponding to an amount of the operation of the steering device;
an actuator control valve configured to control the flow rate of the hydraulic oil flowing from the hydraulic pump to the work machine actuator;
a meter-in compensator which is provided in a meter-in passage connecting the hydraulic pump to the steering control valve, and is configured to adjust an opening degree of the meter-in passage in such a manner that the opening degree of the meter-in passage is increased as the opening degree of the spool of the steering control valve is increased by the operation of the steering device;
a bleed-off compensator which is provided in a bleed-off passage connecting the hydraulic pump to the actuator control valve and is configured to adjust an opening degree of the bleed-off passage in such a manner that the opening degree of the bleed-off passage is reduced with an increase in a pressure of the hydraulic oil flowing to the steering actuator;
a vehicle state detecting unit configured to detect a state of the vehicle;
a controller configured to determine whether or not the state of the vehicle which is detected based on a signal output from the vehicle state detecting unit meets a predetermined steering limiting condition, and output a flow rate limiting command when the controller determines that the state of the vehicle meets the predetermined steering limiting condition; and
a flow rate control mechanism configured to reduce the flow rate of the hydraulic oil flowing to the steering actuator in such a manner that the flow rate of the hydraulic oil flowing to the steering actuator becomes lower than the flow rate of the hydraulic oil corresponding to the amount of the operation of the steering device, in response to the flow rate limiting command received as an input from the controller,
wherein the flow rate control mechanism is configured to reduce the flow rate of the hydraulic oil flowing through the steering control valve to reduce the flow rate of the hydraulic oil flowing to the steering actuator,
wherein the meter-in compensator is configured to adjust the opening degree of the meter-in passage based on a differential pressure between an inlet pressure and an outlet pressure of the steering control valve which are input to the meter-in compensator in such a manner that the opening degree of the meter-in passage is increased as the outlet pressure is increased by the operation of the steering device, and
wherein the flow rate control mechanism includes a pressure adjustment valve which reduces the outlet pressure input to the meter-in compensator, in response to the flow rate limiting command input to the flow rate control mechanism.

2. The hydraulic drive system according to claim 1,
wherein the controller is configured to determine whether or not the state of the vehicle meets a predetermined flow rate switching condition based on the state of the vehicle which is detected by the vehicle state detecting unit, and output a flow rate switching command corresponding to the predetermined flow rate switching condition, and
wherein the flow rate control mechanism is configured to change a reduction amount of the flow rate of the hydraulic oil flowing to the steering actuator, in response to the flow rate switching command input to the flow rate control mechanism.

3. The hydraulic drive system according to claim 2,
wherein the vehicle state detecting unit is configured to detect a speed of the vehicle, and
wherein the flow rate switching condition includes a condition relating to the speed of the vehicle.

4. The hydraulic drive system according to claim 2,
wherein the vehicle state detecting unit is configured to detect a temperature of the hydraulic oil, and
wherein the flow rate switching condition includes a condition relating to the temperature of the hydraulic oil.

5. The hydraulic drive system according to claim 2,
wherein the vehicle state detecting unit is configured to detect an operation speed of the steering device, and
wherein the flow rate switching condition includes a condition relating to the operation speed of the steering device.

6. A hydraulic drive system comprising:
a hydraulic pump to which a steering actuator for switching a traveling direction of a vehicle and a work machine actuator for moving a work machine are connected in parallel;
a steering device for operating the steering actuator;
a steering control valve which includes a spool which is movable according to an operation of the steering device and is configured to move the spool to adjust an opening degree of the spool to flow hydraulic oil from the hydraulic pump to the steering actuator at a flow rate corresponding to an amount of the operation of the steering device;
an actuator control valve configured to control the flow rate of the hydraulic oil flowing from the hydraulic pump to the work machine actuator;
a meter-in compensator which is provided in a meter-in passage connecting the hydraulic pump to the steering control valve, and is configured to adjust an opening degree of the meter-in passage in such a manner that the opening degree of the meter-in passage is increased as the opening degree of the spool of the steering control valve is increased by the operation of the steering device;
a bleed-off compensator which is provided in a bleed-off passage connecting the hydraulic pump to the actuator control valve and is configured to adjust an opening degree of the bleed-off passage in such a manner that the opening degree of the bleed-off passage is reduced with an increase in a pressure of the hydraulic oil flowing to the steering actuator;
a vehicle state detecting unit configured to detect a state of the vehicle;
a controller configured to determine whether or not the state of the vehicle which is detected based on a signal output from the vehicle state detecting unit meets a predetermined steering limiting condition, and output a flow rate limiting command when the controller determines that the state of the vehicle meets the predetermined steering limiting condition; and
a flow rate control mechanism configured to reduce the flow rate of the hydraulic oil flowing to the steering actuator in such a manner that the flow rate of the hydraulic oil flowing to the steering actuator becomes lower than the flow rate of the hydraulic oil corresponding to the amount of the operation of the steering device, in response to the flow rate limiting command received as an input from the controller,
wherein the flow rate control mechanism is configured to reduce the flow rate of the hydraulic oil flowing through the steering control valve to reduce the flow rate of the hydraulic oil flowing to the steering actuator,
wherein the bleed-off compensator is configured to adjust the opening degree of the bleed-off passage based on a differential pressure between an outlet pressure of the steering control valve and an inlet pressure of the bleed-off compensator which are input to the bleed-off compensator in such a manner that the opening degree of the bleed-off passage is increased as the outlet pressure which is a pressure of the hydraulic oil flowing to the steering actuator is reduced, and
wherein the flow rate control mechanism includes a pressure adjustment valve which reduces the outlet pressure input to the bleed-off compensator, in response to the flow rate limiting command input to the flow rate control mechanism.

7. A hydraulic drive system comprising:
a hydraulic pump to which a steering actuator for switching a traveling direction of a vehicle and a work machine actuator for moving a work machine are connected in parallel;
a steering device for operating the steering actuator;
a steering control valve which includes a spool which is movable according to an operation of the steering device and is configured to move the spool to adjust an opening degree of the spool to flow hydraulic oil from the hydraulic pump to the steering actuator at a flow rate corresponding to an amount of the operation of the steering device;
an actuator control valve configured to control the flow rate of the hydraulic oil flowing from the hydraulic pump to the work machine actuator;
a meter-in compensator which is provided in a meter-in passage connecting the hydraulic pump to the steering control valve, and is configured to adjust an opening degree of the meter-in passage in such a manner that the opening degree of the meter-in passage is increased as the opening degree of the spool of the steering control valve is increased by the operation of the steering device;
a bleed-off compensator which is provided in a bleed-off passage connecting the hydraulic pump to the actuator control valve and is configured to adjust an opening degree of the bleed-off passage in such a manner that the opening degree of the bleed-off passage is reduced with an increase in a pressure of the hydraulic oil flowing to the steering actuator;
a vehicle state detecting unit configured to detect a state of the vehicle;
a controller configured to determine whether or not the state of the vehicle which is detected based on a signal output from the vehicle state detecting unit meets a predetermined steering limiting condition, and output a flow rate limiting command when the controller determines that the state of the vehicle meets the predetermined steering limiting condition; and a flow rate control mechanism configured to reduce the flow rate of the hydraulic oil flowing to the steering actuator in such a manner that the flow rate of the hydraulic oil flowing to the steering actuator becomes lower than the flow rate of the hydraulic oil corresponding to the amount of the operation of the steering device, in response to the flow rate limiting command received as an input from the controller, wherein the steering device is configured to output pilot oil to the steering control valve at a flow rate corresponding to the amount of the operation of the steering device, wherein the steering control valve is configured to move the spool to a position corresponding to the flow rate of the pilot oil from the steering device to adjust the opening degree of the spool, and wherein the flow rate control mechanism includes a flow rate control valve which adjusts the flow rate of the pilot oil, in response to the flow rate limiting command input to the flow rate control mechanism.

* * * * *